United States Patent [19]

Kruckenberg et al.

[11] 4,249,902

[45] Feb. 10, 1981

[54] DYESTUFF FORMULATIONS

[75] Inventors: Winfried Kruckenberg; Karl H. Schündehütte, both of Leverkusen, Fed. Rep. of Germany

[73] Assignee: Bayer Aktiengesellschaft, Leverkusen, Fed. Rep. of Germany

[21] Appl. No.: 911,034

[22] Filed: May 30, 1978

[30] Foreign Application Priority Data

Jun. 2, 1977 [DE] Fed. Rep. of Germany ....... 2724951
Nov. 18, 1977 [DE] Fed. Rep. of Germany ....... 2751598
Dec. 10, 1977 [DE] Fed. Rep. of Germany ....... 2755167
Dec. 30, 1977 [DE] Fed. Rep. of Germany ....... 2759102

[51] Int. Cl.$^3$ .......................... C09B 1/00; C09B 67/00
[52] U.S. Cl. ........................................... 8/525; 8/653; 8/657; 8/658; 8/659; 8/676; 8/678
[58] Field of Search .................. 8/39 R, 41 R, 82, 84, 8/89 R, 90, 93, 92

[56] References Cited

U.S. PATENT DOCUMENTS

| | | | |
|---|---|---|---|
| 2,058,489 | 10/1936 | Murch et al. | 8/89 |
| 2,061,617 | 11/1936 | Downing et al. | 8/89 |
| 2,088,019 | 7/1937 | Wickert | 8/89 |
| 2,250,098 | 7/1941 | Hardt et al. | 8/89 |
| 4,030,882 | 6/1977 | Blackwell | 8/39 R |
| 4,105,401 | 8/1978 | Koci et al. | 8/89 R |

FOREIGN PATENT DOCUMENTS

| | | |
|---|---|---|
| 515976 | 1/1972 | Switzerland . |
| 1353689 | 5/1974 | United Kingdom . |
| 1467746 | 3/1977 | United Kingdom . |
| 1480319 | 7/1977 | United Kingdom . |

*Primary Examiner*—A. Lionel Clingman
*Attorney, Agent, or Firm*—Sprung, Felfe, Horn, Lynch & Kramer

[57] ABSTRACT

Formulations for dyeing polyesters and polyamides, the dyestuff component of which does not tend to crystallize in the dyebath and the effluents of which can be readily degraded biologically, are obtained in an inexpensive manner when those organophilic dyestuffs which have melting points below 140° C., preferably below 100° C., are used and these dyestuffs are homogeneously mixed with emulsifying polar/non-polar compounds, such as, for example, fatty sulphates and sulphonates, without expensive fine comminution processes.

29 Claims, No Drawings

DYESTUFF FORMULATIONS

The invention relates to dyestuff formulations which can be easily dispersed in an aqueous drying medium and are based on organophilic dyestuffs, for dyeing aromatic polyesters, cellulose esters and synthetic polyamides.

Virtually exclusively organophilic dyestuffs which are almost water-insoluble under dyeing conditions and which are brought into a finely disperse form before the dyeing operation, for example by fine grinding in the presence of dispersing agents acting as stabilizers, are used for dyeing textile materials made of completely synthetic polymers of this type.

The preparation of finely disperse systems of this type is exceptionally expensive, both from the point of view of the apparatus and with regard to the stabilisers to be employed, which should prevent reagglomeration. In addition, the stability of finely disperse systems of this type is frequently also determined by the presence of particular crystal modifications, so that modification conversions must often precede the comminution.

In general, the dispersing agents contained in the dyehouse effluent after the dyeing operation cannot be degraded biologically and must be separated off by troublesome processes.

For these reasons, there has been no lack of attempts to synthesise dyestuffs which can either be applied from organic solvents without ecological pollution, or which can be employed for dyeing organophilic materials without expensive pretreatment.

The following routes, above all, have been proposed for aqueous dyeing systems:

1. Temporarily water-soluble, organic dyestuffs have been described which assume an organophilic character in the dyebath by splitting off the radical conferring solubility and then are absorbed by the materials to be dyed. (Compare DAS (German Published Specification) No. 1,237,061 and DAS (German Published Specification) No. 1,619,479).

2. Dyestuffs have been recommended which contain acid groupings, the anions of which are at least partially soluble in water, and which are absorbed onto the substrate under dyeing conditions when the pH value is lowered. (Compare DAS (German Published Specification) No. 1,266,272).

3. The possibility of using liquid dyestuff formulations of organophilic dyestuffs and water-miscible organic solvents with small amounts of dispersing agents has been indicated. (Compare DOS (German Published Specification) No. 2,047,432).

However, all of these processes also have such severe deficiencies that none of them could hitherto be successful in practice. Deposits of the dyestuffs round the side of the dyeing tank, crystallisations in the dyebath or substantially increased pollution of the effluent by organic constituents are to be mentioned, above all, as reasons for this.

The object of the invention was therefore to develop dyestuff formulations for dyeing polyesters and polyamides which can be obtained without expensive comminution and stabilising processes and which are suitable for dyeing from aqueous dyebaths without the disadvantages described.

It has now been found that this object can be achieved by dyestuff formulations which are obtained by homogenisation, carried out without fine comminution, of hydrotropic mixtures of an organophilic dyestuff which has a melting point below 140° C. and an emulsifying polar/non-polar compound.

Those formulations in which the pure dyestuffs have a melting point below 100° C. are preferred.

The invention furthermore relates to the use of dyeing formulations of this type for dyeing textile structures made of the abovementioned polymeric materials.

The dyestuffs containing in the dyeing formulations according to the invention are known in some cases or are obtainable by known processes and can belong to the most diverse classes of dyestuffs and brighteners.

Suitable examples are azo and azomethine dyestuffs and anthraquinone, nitrodiarylamine, methine, quinophthalone, perinone, acridone, naphthazarine or coumarin dyestuffs and brighteners, as long as they are free from ionic groups, with the exception of carboxyl groups.

The formulations according to the invention can be prepared in various ways. Thus, it is possible to mix the dyestuffs with the emulsifiers, for example to make them into a paste or to melt them if the dyestuffs or auxiliaries are present in the liquid or plastic state. Stable pulverulent dyeing formulations can be obtained, if appropriate after a drying operation and subsequent coarse grinding, by adding inorganic or organic salts.

Possible salts are, above all, those which are capable of absorbing water from moist air without thereby deliquescing. These salts preferably exhibit no surface-active and dispersing properties.

Suitable salts are: alkali metal sulphates, borates, phosphates or acetates as well as alkylamine salts of short-chain fatty acids (for example acetic acid and propionic acid) and of phosphoric acids.

Examples which may be mentioned are: sodium chloride, sodium acetate, magnesium sulphate and, above all, sodium sulphate.

In general, the proportion by weight of the salts is 5–60%. It is preferably between 20 and 35%. In some cases it can be advisable to replace some of the salts by other (non-salt-like) formulating agents, such as, for example, dextrins.

Furthermore, it is also possible to combine the dyestuffs and the polar/non-polar auxiliaries with one another by dissolving in an aqueous and/or organic solvent. Paste-like or pulverulent formulations can then be obtained again by evaporating off the solvents.

Moreover, the liquid formulations obtained when water is used can be employed directly for dyeing. The weight ratio of the two components dyestuffs/auxiliaries in the formulation can vary greatly, the most advantageous ratio in an individual case depending on various factors, for example on the desired state of aggregation, that is to say whether the dyeing formulation is to be employed in the solid, liquid or waxy form. In addition, the amount of emulsifier required also depends on structural factors of the dyestuff component. Thus, for example, the amount of auxiliary required is less in the case of dyestuffs containing polyether groups than in the case of dyestuffs which are substituted either by polar groups, such as sulphonyl, cyano or nitro radicals, or by longer-chain hydrocarbon radicals. In order to standardise the formulations, it is possible to use either the emulsifiers by themselves or as mixtures with other customary extenders. In most cases, a molar ratio of dyestuff to emulsifier of 1:0.1 to 1:4 has proved advantageous; a ratio of 0.8:1 to 1:1 is preferred, an excess of emulsifier in general not being harmful. However, in practice, a ratio of 1:2 will generally be completely adequate.

The preparation of the dyeing formulations is not tied to particular requirements with respect to apparatus. Spray-drying, drum drying or drying in Venuleth apparatuses are just as suitable as simple drying on a metal sheet, after combination of the components, in customary kettles, or the combination of adduct formation and drying in the abovementioned apparatuses. It is particularly advantageous to mix the filter presscake or the oily or pasty dyestuff, such as is immediately obtained in the preparation, with the emulsifiers and to optionally convert the mixture into the dry pulverulent form in a known manner. The fact that during any comminution of the dyestuff/emulsifier mixture no expensive fine comminution devices, such as bead mills and vibratory mills have to be used, but that coarse grinding down to an average particle size of not less than $50\mu$ is completely adequate should be emphasised here.

Furthermore, the formulations according to the invention can contain mould preventatives and water-retention agents in customary amounts.

In the preparation of liquid formulations, it is sometimes also advisable to add organic solvents which are completely or partially water-miscible.

It is usually advisable to add such solvents if the purely aqueous mixtures of dyestuff and emulsifier are too viscous and therefore not capable of flowing, which is the case, in particular, with dyestuffs which have melting points above 100° C.

In general, the proportion by weight of water plus any solvent is 5–80%. It is preferably between 30 and 60%.

Suitable solvents are those which have a boiling point which boil above 80° C., preferably above 100° C., are water-miscible (minimum solubility at 20° C.: 10 g/l) and as far as possible can be readily degraded biologically.

Solvents which are miscible with water in any proportions are preferred.

Examples which may be mentioned are: ethylene glycol, propylene glycol, butylene glycol, formic acid, acetic acid, n-propanol, hydroxyacetone, methyl propyl ketone, cyanoethanol, urea, alkylureas, dimethylformamide, N-methylpyrrolidone, dimethylsulphoxide, acetylacetone, methyl acetoacetate and acetonitrile.

However, purely aqueous systems are particularly preferred. Polar/non-polar auxiliaries which are suitable for the preparation of the dyeing formulations are those of the general formula (I)

A—(B)$_n$—(D)$_m$     (I)

in which
- A denotes a non-polar radical with at least 8 consecutive C atoms, carbocyclic aromatic rings linked in the 1- and 4-position being evaluated as 4 in counting consecutive carbon atoms and those linked in the 1- and 2-position or 1- and 3-position being evaluated as 2 or 3 respectively,
- B represents a bridge member which links the non-polar radical A and the polar, hydrophilic radical D, wherein
- n denotes an integer from 0–5, preferably 0–1,
- D represents a hydrophilic group, which can be cationic, non-ionic or, preferably, anionic, and
- m represents an integer from 1–5, preferably 1.

A summary of suitable radicals A, B and C can be seen from Table 1 in "Tenside Detergents", volume 11, 1974, book 4, page 186.

Accordingly, by non-polar radicals A there are to be understood, above all, branched and straight-chain, aliphatic groups, derivatives of terpene, non-fused benzene groups, aromatic systems with fused rings, heterocyclic groups with one or more hetero-atoms in the ring or polymeric groups. It is possible for the chains to be interrupted by —O, N or S atoms. The non-polar radical can be substituted by halogen, alkyl, aralkyl or aryl.

Examples of suitable groupings B are —O—, —S—, —NR—, —CO—NR—, —NR—CO—, NR—CX—NR—, —NR—CX—(CH$_2$)$_{n'}$—, —SO$_2$—, —SO$_2$—NR—, —NR—SO$_2$—(CH$_2$)$_{n'}$—, —NR—CO—Ar—, —NR—(CH$_2$)$_{n'}$—Ar and the like. In these formulae,
- R denotes hydrogen or alkyl,
- X denotes —O—, —S— or —NR— and
- n' denotes an integer from 0-5.

Anionic, hydrophilic groups D can be —COOH, —O—SO$_3$H, —SO$_3$H, —S—SO$_3$H, —SO$_2$H and other groups containing sulphur, such as —SO$_2$—NH—SO$_2$—, alkyl esters of ortho-phosphoric acid, phosphonic acids or peracid groupings in the form of their salts, in particular alkali metal salts, such as Na salts and K salts.

Cationic groups D which may be mentioned are primary, secondary and tertiary amines in their protonated form, amine oxides, quaternary ammonium groups, pyridinium, quinnolinium or similar bases or sulphonium or phosphonium derivatives. Uncharged groupings D which may be mentioned are hydroxyalkyl or hydroxyaryl, branched or straight-chain polyether chains, derivatives of sorbitol, mannitol, carbohydrates and similar compounds, oxyalkylated derivatives of sorbitol, mannitol and similar compounds, carbonyl groups, ureas or ureides and polypeptides.

Furthermore, the molecule A—B—D can carry combinations of cationic, anionic and uncharged hydrophillic groups in D.

From the group of the polar/non-polar auxiliaries of the general formula I, those of the general formula II

A—(B)$_n$—(D$_1$)$_m$     (II)

in which
A, B, n and m have the meaning indicated and
D$_1$ represents an anionic or uncharged group, are to be singled out.

Emulsifiers which, in the form of the free acid, correspond to the general formula III

A$_1$—(B)$_n$—(D$_2$)$_{m1}$     (III)

in which
B has the meaning indicated and
A$_1$ denotes a non-polar radical which has an aliphatic carbon chain of at least 10 consecutive C atoms and can be optionally substituted by halogen, alkyl, aralkyl, aryl or alkoxycarbonyl,
n represents an integer from 0–2,
m$_1$ represents 1 or 2, preferably 1 and
D represents a radical of the formula —COOH, —SO$_3$H, —O—SO$_3$H, —PO$_3$H$_2$ or —O—PO$_3$H$_2$, are particularly important.

From this group, polar/non-polar compounds of the general formula IV $$A_2-D_3 \tag{IV}$$

are particularly important.

In this formula, $A_2$ represents an aliphatic hydrocarbon chain with at least 10 C atoms, which can be further substituted as indicated for $A_1$, and $D_3$ represents $-SO_3H$, $-O-SO_3H$ or $OPO_3H_2$.

Finally, emulsifiers of the formula V $$A_3-D_4 \tag{V}$$

in which $A_3$ represents an aliphatic C chain with at least 10, preferably 12-18, consecutive C atoms and $D_4$ represents a $-O-SO_3H$ group, are to be singled out in particular, and the biological degradability of these types is to be emphasised as a particular advantage.

Examples of emulsifiers with a polar/non-polar structure which are suitable for the preparation of the dyeing formulations according to the invention are the following: fatty acid soaps, such as sodium laurate, sodium oleate, sodium linoleate, ammonium ricinoleate, oleic acid esters of sodium isethionate or sodium palmitate, sodium bis-(2-ethylhexyl)-sulphosuccinate, sodium N-methyl-N-oleyl taurate, β-(tert.-octylphenoxy) β'-(Na sulphonate)-diethyl ether, sodium isododecylbenzenesulphonate, sodium dodecylsulphate, sodium N-oleyl sulphanilate, dodecylphosphonic acid, sodium dodecylbenzimidazolesulphonate, alkoxyaryl-sulphates, alkylsulphaminoaryl compounds, dodecylphenol-sulphate, dodecylbenzenesulphamic acid, dibutylnaphthol-sulphate and dioctylnaphthol-sulphate. Cationic surface-active agents which may be mentioned are dodecylamine acetate, dodecylbenzyldimethylammonium chloride and (n-heptadecyl-N-aminoethyl)-imidazoline acetate. Non-ionic surface-active agents are polyethylene glycol monododecyl ether, polyethylene glycol mono-(isooctyl)-phenyl ether, polyethylene glycol monooleate and sorbitol monostearate polyglycol ether.

Whilst many of the dyestuffs according to the invention are almost water-insoluble and dye from stable, aqueous suspensions of fine particles (0.5–2μ), in common with the conventional organic so-called disperse dyestuffs, they can be used for dyeing from emulsions or from solutions or colloidal solutions.

The property of being present under dyeing conditions in the liquid, emulsified or dissolved form, together with emulsifiers of the general formula I, which is required for this can be promoted in known chromophoric systems by suitable substitution, preferably by relatively long hydrocarbon radicals. However, preferred substituents are groupings which have a hydrophillic action, such as

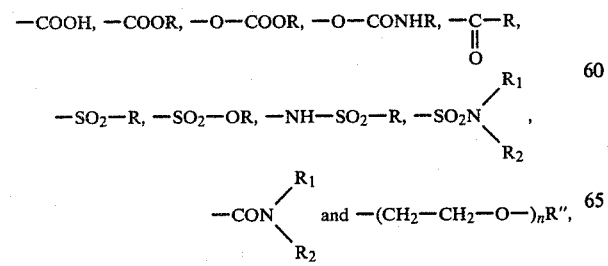

wherein

R represents optionally substituted alkyl, aralkyl or aryl, $R_1$ and $R_2$ denote hydrogen or optionally substituted alkyl, alkenyl, aralkyl or aryl, n represents integers from 1–8 and R" represents $R_1$ or acyl.

From this group, those dyestuffs which carry the following substituents:

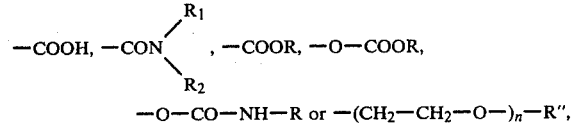

wherein the radicals R and n have the meaning indicated above, are of particular importance.

Suitable products can either be synthesised from correspondingly substituted starting materials, or the substituents can be transferred to the dyestuff skeleton by conversion reactions, such as alkylations, esterifications or acylations.

The dyestuffs or brighteners can contain one or more, identical or different groupings of the type mentioned.

In their preferred form, they correspond to the formula $$F-(G)_x-(R)_y \tag{VI}$$

in which

F represents a chromophoric or brightening system,

G represents a direct bond or an at least divalent bridge member which cannot be split off under dyeing conditions, R represents a substituent which lowers the melting point, such as hydrocarbon radicals ($C_4-C_{24}$, in particular $C_6-C_{16}$) or polyoxyalkylene radicals (preferably with 2–10 oxyalkylene units), which additionally have a hydrophilic action, and x and y represent 1–4, preferably 1.

From this group, dyestuffs of the general formula $$F_1-(G_1)_x-(R_1)_y \tag{VII}$$

in which x and y represent 1–4, $F_1$ represents a chromophoric system of the azo, azomethine, anthraquinone, methine, quinophthalone, perinone or diarylamine series, $G_1$ represents a direct bond or a polyvalent bridge member from the group comprising:

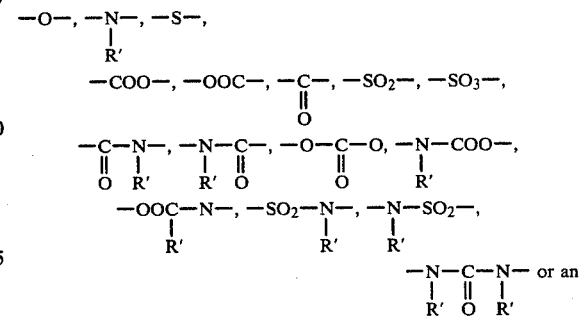

optionally substituted alkylene or arylene radical,
wherein
R' denotes H or $C_1$-$C_4$-alkyl radicals or $R_1$, and
$R_1$ represents a saturated or unsaturated, optionally substituted, cyclic, straight-chain or branched hydrocarbon radical with 4-12 carbon atoms or groupings of the general formula $$-(A-O)_n-W \quad \text{(VIII)}$$

in which
A denotes a alkylene radical with 2-4 carbon atoms, which can be straight-chain, branched or substituted,
n represents integers from 2-10 and
W represents H, alkyl, alkenyl, acyl, aryl, aralkyl or hetaryl,
are of particular importance.

Dyestuffs of the general formula $$F_2-(G_2)_x-(R_2)_y \quad \text{(IX)}$$

in which
x and y represent 1-3,
$F_2$ represents a chromophoric system of the azo, anthraquinone, perinone or quinophthalone series,
$G_2$ represents a direct bond or a bridge member from the group comprising $$-O-, -\underset{R'}{N}-, S, -SO_2-, -COO-, -\underset{\|}{\overset{\|}{C}}-, $$
$$-\underset{O}{\overset{\|}{C}}-\underset{R'}{N}-, -\underset{R'}{N}-\underset{O}{\overset{\|}{C}}-, -SO_2-\underset{R'}{N}-, -\underset{R'}{N}-SO_2-,$$
$$-O-\underset{O}{\overset{\|}{C}}-\underset{R'}{N}-, -\underset{R'}{N}-\underset{O}{\overset{\|}{C}}-O-,$$

alkylene or arylene,
R' represents H or a $C_1$-$C_4$-alkyl radical or $R_2$ and
$R_2$ denotes a straight-chain or branched, aliphatic hydrocarbon radical with 4-12 carbon atoms and/or a radical of the formula $$-(A_1-O-)_{n1}W_1 \quad \text{(X)}$$

in which
$A_1$ represents an optionally substituted ethylene radical, and
$W_1$ denotes H, alkyl or alkenyl, aryl or acyl,
$n_1$ represents integers from 3-8 and
R' for H or an alkyl radical or $R_2$
are to be singled out here.

Finally, dyestuffs of the general formula $$F_3-(G_3)_{x'}-(R_3)_{y'} \quad \text{(XI)}$$

in which
x' and y' denote 1 or 2,
$F_3$ denotes the radical of an azo or anthraquinone dyestuff,
$G_3$ represents a direct bond or a bridge member of the formulae $$-O-, -\underset{R'}{N}-, -COO-, -\underset{O}{\overset{\|}{C}}-\underset{R'}{N}-, -\underset{R'}{N}-\underset{O}{\overset{\|}{C}}-,$$

$$-SO_2-\underset{R'}{N}-, -\underset{R'}{N}-SO_2-, -O-\underset{O}{\overset{\|}{C}}-\underset{R'}{N}- \text{ and } -\underset{R'}{N}-\underset{O}{\overset{\|}{C}}-O-.$$

and
$R_3$ represents the grouping $-(CH_2-CH_2-O)_{n_2}-W_2$,
wherein
$n_2$ represents integers from 3-8 and
$W_2$ denotes H, alkyl or $$-\underset{O}{\overset{\|}{C}}-R'',$$

wherein
R'' represents an optionally substituted alkyl or aryl radical,
are very particularly important.

Numerous dyestuffs which are suitable for the preparation of the dyeing formulations according to the invention have already been described in patent specifications and scientific publications. The following, in no way complete, list of literature references may be given here: German Reichspatent No. 644,861; DOS (German Published Specification) No. 1,544,598; DOS (German Published Specification) No. 2,047,432, Z. chem. 1973, volume 1, page 15–16; Z. chem. 1974, volume 11, page 449–450; Teintex 1952 (volume 17), pages 290–294; DOS (German Published Specification) No. 2,111,370; DOS (German Published Specification) No. 1,544,599; DOS (German Published Specification) No. 2,318,294; DOS (German Published Specification) No. 2,437,432; French Pat. No. 1,417,575; French Pat. No. 769,195; Japanese Pat. No. 4,726,417; Japanese Pat. No. 4,856,975; Japanese Pat. No. 7,629,531; British Pat. No. 568,037; British Pat. No. 1,353,689, British Pat. No. 1,319,102; British Pat. No. 1,413,322; British Pat. No. 1,431,442; British Pat. No. 1,388,075; British Pat. No. 1,274,440; British Pat. No. 1,274,393; British Pat. No. 1,282,246; British Pat. No. 1,281,778; British Pat. No. 1,283,278; British Pat. No. 1,278,179; British Pat. No. 1,309,703; British Pat. No. 1,279,529; British Pat. No. 1,292,096; U.S. Pat. No. 2,266,142; U.S. Pat. No. 3,449,319; U.S. Pat. No. 2,359,305; U.S. Pat. No. 2,131,712; U.S. Pat. No. 1,807,642; U.S. Pat. No. 3,734,857; U.S. Pat. No. 3,157,633; U.S. Pat. No. 3,445,454; U.S. Pat. No. 3,753,644; U.S. Pat. No. 3,743,476; U.S. Pat. No. 3,740,186; U.S. Pat. No. 3,793,330; U.S. Pat. No. 3,793,331; U.S. Pat. No. 3,775,049 and U.S. Pat. No. 3,754,858.

Particularly preferred dyestuffs, which contain at least one grouping which lowers the melting point and/or has a hydrophilic action, are derived, for example, from the following classes of compounds:

(a) Monoazo dyestuffs of the formula $$D-N=N-Ar-N\underset{K_2}{\overset{K_1}{\diagup\!\!\!\diagdown}} \quad \text{(XII)}$$

in which
D represents the radical of an aromatic carbocyclic or heterocyclic diazo component,
Ar for the radical of an aromatic carbocyclic or heterocyclic coupling component and $K_1$ and $K_2$ denote H, alkyl, aralkyl or aryl or oxyalkyl groups, $K_1$, $K_2$ or Ar carrying at least one substituent R, optionally via a bridge member.

(b) Monoazo dyestuffs of the formula $$D_1-N=N-Ar-N\begin{matrix}K_3\\K_4\end{matrix} \qquad (XIII)$$

in which
$D_1$ represents the radical of a carbocyclic or heterocyclic diazo component which carries at least one substituent R, optionally linked via a bridge member,
Ar has the meaning indicated in (a) and
$K_3$ and $K_4$ denote H or optionally substituted alkyl, aryl, aralkyl or oxyalkyl groups.

(c) Monoazo dyestuffs of the formula $$D_2-N=N-K \qquad (XIV)$$

in which
$D_2$ represents the radical of a carbocyclic or heterocyclic diazo component and
K represents the radical of a coupling component of the phenol, naphthol, acylacetamide, 5-pyrazolone, pyridone or quinolone series, at least one of the radicals $D_2$ or K carrying at least one substituent —G—R, which is optionally linked via the phenolic or enolic oxygen atom.

(d) Disazo dyestuffs of the formula $$Ar_1-N=N-Ar_2-N=N-Ar_3 \qquad (XV)$$

in which
$Ar_2$ denotes an arylene radical and
$Ar_1$ and $Ar_3$ represent aryl or hetaryl radicals, and at least one substituent —G—R must be present in $Ar_1$, $Ar_2$ or $Ar_3$.

(e) Anthraquinone dyestuffs of the general formula (XVI)

wherein
E represents halogen, preferably bromine or chlorine, alkoxy- or aryloxy, the carboxyl group or functional derivatives thereof or optionally substituted alkyl and aryl radicals,
n denotes 0, 1 or 2 and
$A_1$, $A_2$, $A_3$ or $A_4$ each denote hydrogen, an amino group which is optionally substituted by alkyl, aralkyl, cycloalkyl, aryl or hetaryl radicals of the hydroxyl or nitro group, at least one of the radical $A_1$, $A_2$, $A_3$ and $A_4$ representing an optionally substituted amino group or hydroxyl and the substituents $A_1$–$A_4$ or E or the anthraquinone nucleus itself carrying at least one substituent R, optionally linked via a bridge member.

(f) Quinophthalone dyestuffs of the formula (XVII)

in which
$E_1$ and $E_2$ denote hydrogen, halogen, alkoxy, acyloxy, acylamino or the carboxyl group or functional derivatives thereof and
m denotes 0, 1 or 2, and the quinoline or the phthaloyl radical carries at least one substituent —G—R.

(g) Nitro-diarylamino dyestuffs of the formula (XVIII)

in which
$E_3$ denote hydrogen, alkoxy or aryloxy, substituted amino, halogen, arylazo, carboxyl or functional derivatives of a sulphonic acid or carboxyl radical and at least one of the aromatic rings or $E_3$ carries at least one substituent G—R.

(h) Methine dyestuffs of the formula (XIX)

in which
$K_1$ and $K_2$ denote H or optionally substituted alkyl, aralkyl or oxyalkyl groups,
$E_4$ represents hydrogen, alkyl or alkoxy and
$V_1$ and $V_2$ represent nitrile, alkoxycarbonyl, alkylcarbonyl or alkylsulphone groups.

Either $V_1$, $V_2$, $K_1$, $K_2$, $E_4$ or the aromatic ring must carry at least one substituent —G—R.

Unless defined otherwise, the alkyl and alkoxy radicals mentioned above and in the following text in any connection preferably contain 1–4 C atoms and can be substituted by substituents which are customary in the chemistry of dyestuffs and auxiliaries (for example OH, CN, Cl, $NO_2$, F, Br, alkoxycarbonyl or alkoxy), with the exception of ionic radicals (other than COOH) in the case of dyestuff radicals.

Suitable aryl or aryloxy radicals are naphthalene and, in particular, benzene radicals, which are optionally substituted, for example by alkyl, alkoxy, Cl, F, Br, $NO_2$, alkoxycarbonyl, $CF_3$, CN or COOH.

Examples of suitable acyl radicals are alkylcarbonyl, arylcarbonyl, alkylsulphonyl, arylsulphonyl and alkoxycarbonyl.

Suitable hetaryl radicals are pyridyl, thienyl, furyl, quinolinyl, thiazolyl, thiadiazolyl and pyrazolyl.

Suitable alkylene radicals preferably have 2–10 C atoms in the chain, which can be optionally substituted by alkyl, aryl, aralkyl or COOH.

Suitable alkenyl radicals contain 2–5 C atoms.

Suitable arylene radicals are naphthylene and, above all, phenyl radicals, which can be substituted, for example by alkyl or aryl.

Suitable derivatives of the carboxyl group are nitriles, carboxylic acid amides, alkyl esters, acid anhydrides and imides.

The new dyeing formulations are preferably suitable for brightening, dyeing and printing textile structures made of linear polyesters (for example polyethylene terephthalate) and cellulose esters, such as cellulose triacetate, it also being possible for fibre mixtures, such as polyamide/polyester, cotton/polyester or wool/polyester, to be employed. Polyesters are preferred.

The dyeings can be effected in open or closed systems, for example in circulatory apparatuses, such as cheese dyeing apparatuses or beam dyeing apparatuses, winch vats, nozzle-dyeing machines or drum dyeing machines and the like.

The fibre material is dyed in an acid to weakly alkaline bath, preferably appropriately at a pH value 3–7 or 3.5–6.

In addition to the agents which influence to pH, the bath can contain further auxiliaries which are customary in the textile industry, such as wetting agents, retarding agents, carriers or levelling agents.

If dyestuff formulations with a low solubility in the cold are used, it is advisable to meter the formulation into the dyeing apparatus only at elevated temperature, for example the dyeing temperature.

The new dyestuff formulations, together with the thickeners of natural and synthetic origin which are customary in the textile printing industry, are suitable for textile printing.

In addition to the dyeing processes from a long liquor, continuous dyeing procedures are also outstandingly suitable for the new dyestuff formulations, fixing of the dyestuffs being achieved by after-treatment with heat, for example by steaming at temperatures of 98°–105° C. or by thermofixing at 180°–210° C.

The dyestuff formulations according to the invention containing dyestuffs which can be sublimed are also suitable for carrying out a heat transfer printing process.

In spite of the very low melting points in some cases and the liquid consistency, it is possible to prepare both stable pulverulent formulations and optionally liquid formulations by the processes indicated, which was not hitherto possible in the case of conventional finishing processes for dyestuffs to be used in aqueous dyeing methods.

The new dyeing formulations are in the liquid or dissolved form under dyeing or printing conditions. Because of the combined properties, in particular of the specifically substituted dyestuffs and the polar/non-polar auxiliaries, in most cases the use of additional surface-active agents, such as dispersing agents, protective colloids or levelling agents, or also carriers in dyeing and printing is spared.

In addition to being very simple to manufacture and avoiding the dispersing agents which act as stabilisers in the case of conventional dyestuffs and which cannot be degraded biologically, the dyestuff formulations have the additional advantage of considerably lowering the effluent pollution by dyeing auxiliaries.

Further advantages which may be mentioned are the outstanding combination properties of the formulations, even with conventional disperse dyestuffs, the exceptional levelling properties of these formulations and finally the fact that the necessity of removing by reductive after-treatment the dyestuff portions adsorbed onto the surface of the fibres is eliminated in most cases, up to relatively good depths of colour, above all with the dyestuffs which have been rendered hydrophilic.

Finally, the suitability of the new formulations for dyeing the types of fibres mentioned by the extraction method should be singled out, in which the circulating liquor flows through a reservoir charged with the new formulations, the dyestuff being extracted in a dissolving operation and being passed to the substrate to be dyed (compare DOS (German Published Specification) Nos. 1,918,309, 2,215,336 and 2,247,568). The circulating liquor is preferably purely aqueous, that is to say it contains no organic solvents, carriers, emulsifying agents and dispersing agents.

The dyeing formulations according to the invention make possible dyeing processes which are essentially free from the problems of the stability of the dispersion which occur in the case of conventional dyestuffs for polyesters, above all under exposure to heat or mechanical load, that is to say the formulations considerably increase the dependability of the dyeing processes.

The percentage data given above and in the following text are percent by weight.

EXAMPLE 1

40 g of the crude, mobile, hydrated dyestuff of the formula

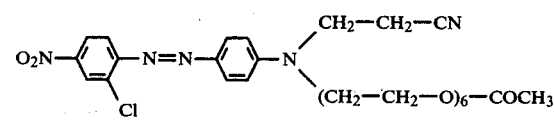

as is obtained, washed until free from salts, by the customary preparation method for azo dyestuffs by coupling the components in aqueous solution, are dissolved with 30 g of lauryl sulphate in 300 ml of water, and 17.5 g of sodium sulphate (anhydrous) and 17.5 g of ammonium sulphate are added, whilst stirring. This solution is dried to a fine powder in a known manner with the aid of a spray-drier.

The formulation thus obtained contains about 33% of dyestuff and dissolves readily in cold water.

(a) 2 g of this dyestuff formulation are dissolved in a dyebath of 500 ml of water which contains 0.5 g of $NaH_2PO_4$ and acetic acid to correct the pH to pH 5. 50 g of a fabric made of polyester material are dyed in this liquor by heating the dyebath to 120° C., whilst sufficiently agitating the fabric or/and with an adequately extensive circulation of the liquor, and keeping the bath at this temperature for one hour. The fabric is then rinsed and dried. A red dyeing with good fastness properties in use, in particular good fastness to light, is obtained.

In the case of a dyeing using small amounts of the formulation, such as are necessary, for example, for pastel shades, in order to ensure a level dyeing is achieved it is appropriate to add a little levelling agent to the dye liquor, especially if the fabric has been insufficiently scoured.

(b) 50 g of this dyestuff formulation are dissolved in 1,000 ml of water. A fabric made of polyester material is impregnated with this liquor, squeezed out, intermediately dried and then dyed by heating to 210° C. for 60 seconds. The fabric is then rinsed and dried.

A red dyeing which has penetrated well and has good use properties and outstanding penetration is obtained.

Formulations with similar properties are obtained if the sodium sulphate/ammonium sulphate mixture is replaced by one of the salts by itself or by other salts, such as, for example, by sodium chloride, magnesium sulphate or sodium phosphate, and/or the dyestuff of the formula

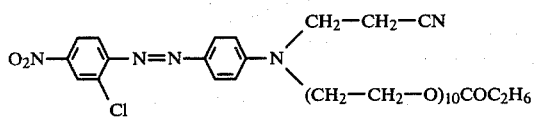

is employed.

EXAMPLE 2

40 g of the dyestuff of the formula

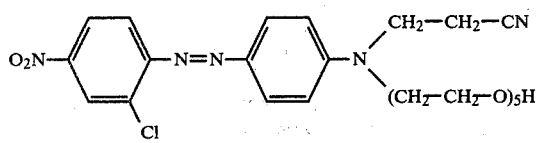

in the form of the crude, hydrated dyestuff are mixed with 30 g of lauryl-sulphate and 70 g of water. A liquid formulation is obtained which is stable on storage and is outstandingly suitable for dyeing polyester fibres.

Formulations with similar properties to those in Example 1 and 2 are obtained if, instead of the lauryl-sulphate, the same molar amount of cetyl stearyl sulphate, dodecylbenzenesulphonic acid, oleyl cetyl sulphate, a mixture of the methyl esters, sulphated in the α-position, of stearic acid and palmitic acid, dibutylnaphthalenesulphonic acid, dodecyldimethyl-benzyl-ammonium chloride, 2-hexyldodecanol-sulphate or 15 times the amount of octyl sulphate is used.

EXAMPLE 3

100 g of the crude, mobile, hydrated dyestuff of the formula

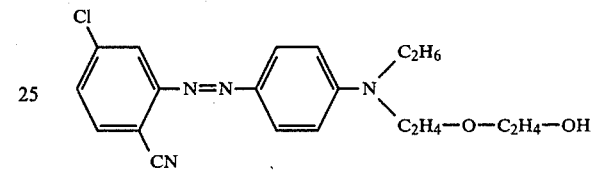

prepared as described in Example 1, are dissolved with 50 g of dodecyl-sulphate in 600 g of water and 250 g of dextrin are introduced, whilst stirring. The solution thus obtained can be employed directly as a dyeing formulation. However, when dried on metal sheets and comminuted, it can also be converted into a pulverulent or granular dyeing formulation. If dyeing is carried out as indicated in Example 1, ruby-red dyeings with good general fastness properties are obtained.

EXAMPLE 4

100 g of the dyestuff of the formula

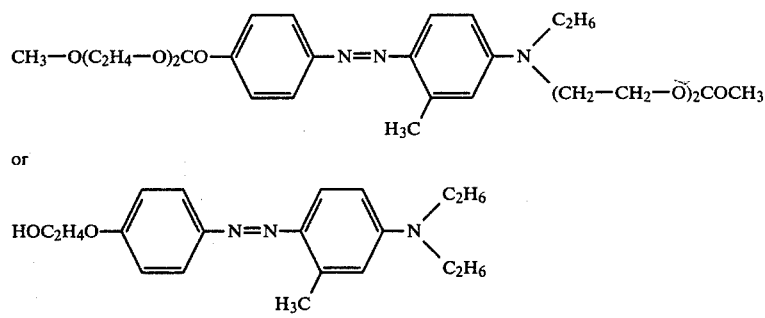

melting point 52° C. are stirred intensively with 200 g of dodecyl-sulphate, 2 g of glacial acetic acid and 500 g of water at 40° C. until a homogeneous solution is obtained. The paste thus obtained is dried at 50° C. in vacuo and, after cooling, is coarsely comminuted. If dyeing is carried out as described in Example 1 using the formulation thus obtained, an orange dyeing with good general fastness properties is obtained. If 100 g of dodecylbenzenesulphonic acid, 90 g of oleyl cetyl sulphate, 100 g of a mixture of the α-sulphonates of the methyl esters of stearic acid and palmitic acid or 500 g of dibutylnaphthalenesulphonate are used with the same amount of dyestuff, dyeing formulations which are suitable for dyeing in the same manner are obtained.

If 100 g in each case of the dyestuff of the formula $$CH_3-O(C_2H_4-O)_2CO-\langle\text{—}\rangle-N=N-\langle\text{—}\rangle-N\begin{matrix}C_2H_6\\(CH_2-CH_2-O)_2COCH_3\end{matrix}$$
$$\overset{|}{H_3C}$$

or $$HOC_2H_4O-\langle\text{—}\rangle-N=N-\langle\text{—}\rangle-N\begin{matrix}C_2H_6\\C_2H_6\end{matrix}$$
$$\overset{|}{H_3C}$$

are used instead of the above dyestuff and 150 g of lauryl myristyl sulphate are used, dyeing formulations which are readily soluble in water and which, when used for dyeing as in Example 1, give yellow dyeings with good general fastness properties are likewise obtained.

EXAMPLE 5

100 g of the dyestuff of the formula

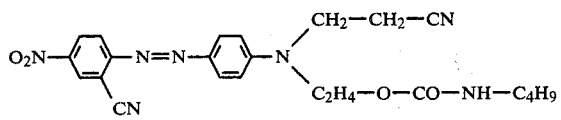

(melting point 134° C.) in the form of its aqueous press-cake, 200 g of lauryl myristyl sulphate and 100 g of sodium sulphate (anhydrous) are homogeneously kneaded at 145° C. and, after cooling, the mixture is coarsely ground.

In a high temperature dyeing apparatus which contains a device by means of which additives can be metered into the dyebath at the dyeing temperature, 50 g of polyester fabric are rapidly heated up to 140° C. in a bath which contains 1 g of $NaH_2PO_4$ and acetic acid to correct the pH to pH 5. After the temperature has been reached, 2 g of the dyestuff formulation obtained above are flushed into the dyebath. Dyeing is carried out at 140° C. for 30 minutes, whilst sufficiently agitating the polyester material or/and with an adequately extensive circulation of the liquor. The fabric is then rinsed and dried.

A red dyeing with outstanding fastness to light and sublimation is obtained.

EXAMPLE 6

150 g of the dyestuff of the formula

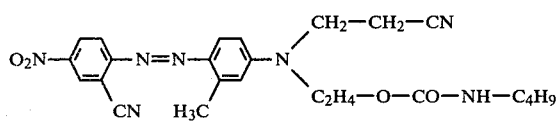

(melting point 130° C.) in the form of its aqueous press-cake, 400 g of dibutylnaphthalenesulphonic acid (Na salt) and 200 g of ammonium sulphate are mixed and homogenised at 140° C. The hard material obtained after cooling is coarsely ground.

If dyeing is carried out at 140° C. with 2 g of this dyestuff formulation as indicated in Example 5, a bluish-tinged red dyeing with high fastness to light and sublimation is obtained.

EXAMPLE 7

30 g of the dyestuff of the formula

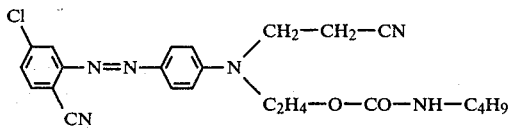

(melting point 114° C.) in the form of its moist press-cake, 30 g of lauryl myristyl sulphate, 30 g of a mixture of fatty alcohol sulphates having 12 to 18 C atoms, 40 g of water and 400 g of n-propanol are homogeneously dissolved at 50°–60° C. The solution thus obtained is subjected to spray-drying in the customary manner. A fine powder is thereby obtained. If 1 g of this dyeing formulation is used for dyeing polyester or cellulose triacetate at 120° C. in the same manner as described in Example 5 or 1(a), a yellow dyeing with high fastness to light and sublimation is obtained.

EXAMPLE 8

100 g of the dyestuff of the formula

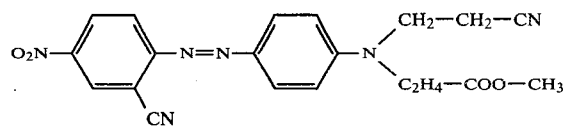

(melting point 120° C.) in the form of a water-containing press-cake which has been washed until free from salts, as is obtained in the preparation by azo coupling, are stirred with 250 g of a mixture of fatty alcohol sulphates having 12 to 18 C atoms and 5 g of glacial acetic acid, water being added in an amount such that, at 80°–90° C., a paste which flows well is formed, and the paste is subjected to spray-drying at an air exit temperature of 80° C. to, preferably, 140° C. It is also possible to dry the paste in a vacuum drying cabinet at 100° C. without further addition of water and to coarsely comminute the resulting product. If 2 g of the pulverulent dyeing formulations thus obtained are used for dyeing polyester at 130° C. as described in Example 5 or 1a, a red dyeing with good fastness to light and sublimation is obtained.

EXAMPLE 9

50 g of the dyestuff of the formula

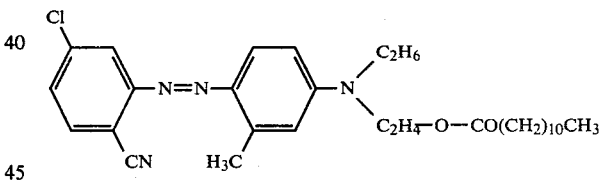

melting point 50° C. or 50 g of the dyestuff of the formula

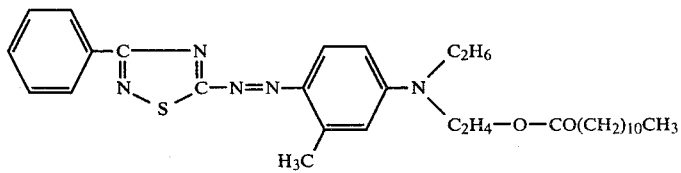

are stirred into 50 g of the emulsifier of the formula

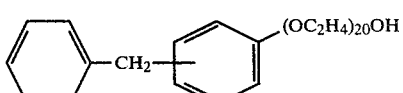

at 80° C. The formulations thus obtained are in the form of a clear solution which dissolves readily in cold water.

1 g of one of these dyeing formulations is dissolved in a dyebath of 500 ml of water which contains 0.5 g of laurylsulphate, 0.5 g of NaH$_2$PO$_4$ and acetic acid to correct the pH to pH 5. After adding 2 g of o-cresotic acid methyl ester, 50 g of polyester material are heated up to 100° C. in this liquor in a dyeing apparatus, whilst sufficiently agitating the material to be dyed and/or with an adequately extensive circulation of the liquor, and dyeing is carried out at this temperature for one hour. The material is then rinsed and dried. An orange or red dyeing with good fastness properties, in particular good fastness to light, is obtained.

EXAMPLE 10

20 g of the dyestuff of the formula

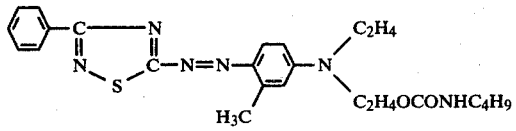

melting point 90° C. 60 g of lauryl myristyl sulphate, 100 g of water and 350 g of methylglycol are dissolved at 60°–70° C., whilst stirring, and the solution is subjected to spray-drying at this temperature. A pulverulent dyeing formulation is obtained which, when dyed onto polyester as indicated in Example 1 under (a) and in Example 9, gives a clear, red dyeing with good fastness to light and sublimation.

EXAMPLE 11

20 g of the dyestuff of the formula

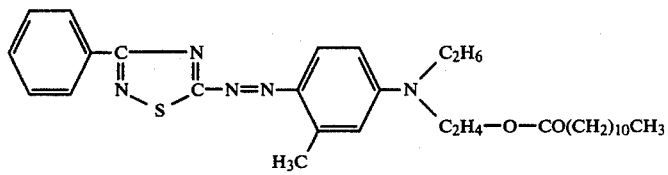

60 g of lauryl myristyl-sulphate, 180 g of water and 240 g of methylglycol are dissolved at 60°–70° C., whilst stirring. This solution is subjected to spray-drying.

If the resulting pulverulent dyeing formulation is used for dyeing polyester fabric as indicated in Example 1(a) or in Example 9, a clear, red dyeing with good fastness properties is obtained.

EXAMPLE 12

50 g of the dyestuff of the formula

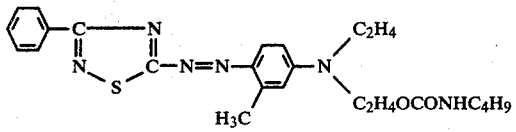

(melting point 90° C.) are introduced into 50 g of the emulsifier of the formula

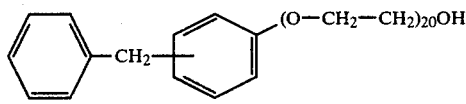

whilst stirring, and the mixture is warmed to 80° C. After cooling, this dyeing formulation is a clear, viscous solution which dissolves readily in cold water.

If the formulation is used for dyeing by the process indicated in Example 13 and in Example 9, a clear, red dyeing is obtained on polyester fabric.

EXAMPLE 13

386 g of the dyestuff press cake (87.5% of pure dyestuff, as is obtained from azo coupling under aqueous conditions and subsequent washing of the product until free from salts) of the formula

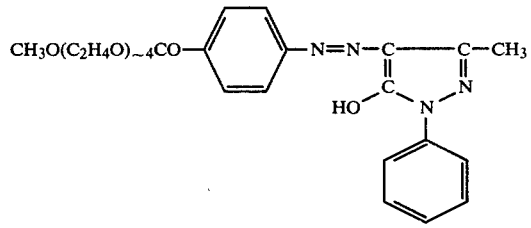

melting point 46° C. are introduced into a solution of 87.5 g of lauryl myristyl sulphate in 200 g of water at 80°–90° C., whilst stirring. As soon as a homogeneous solution has formed, a solution of 87.5 g of sodium sulphate (anhydrous) in 285 g of water having the same temperature is added, whilst stirring further, and stirring is continued for about a further 15 minutes. Thereafter, the mobile solution is subjected to spray-drying. A pulverulent dyeing formulation is obtained which dissolves readily and rapidly in water having a temperature of 60° C.

2 g of this dyestuff formulation are dissolved in a dyebath of 500 ml of water which contains 0.5 g of dodecylsulphate, 0.5 g of NaH$_2$PO$_4$ and acetic acid to correct the pH to pH 5. 50 g of a fabric made of polyester material is dyed in this liquor by heating the dyebath up to 120° C., whilst sufficiently agitating the fabric or/and an adequately extensive circulation of the liquor, and carrying out the dyeing at this temperature for one hour. The fabric is then rinsed and dried. A yellow dyeing with good general fastness properties, in particular good fastness to light, is obtained.

EXAMPLE 14

100 g of the dyestuff of the formula

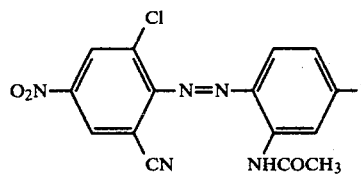

85 g of cetyl stearyl sulphate and 600 g of water are stirred at 90° C. to give a homogeneous solution and the solution is then subjected to spray-drying or drying on a metal sheet. A solid dyeing formulation which dissolves rapidly in warm water is obtained.

If dyeing is carried out according to Example 1 or 9, a blue dyeing with good fastness properties is obtained.

EXAMPLE 15

100 g of the dyestuff of the formula

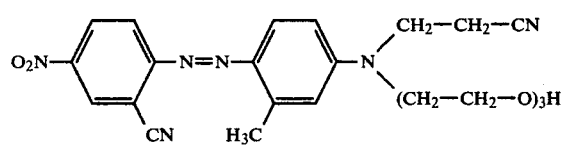

100 g of cetyl stearyl sulphate, 2 g of glacial acetic acid and 10 g of water are kneaded intensively, whilst warming to 110°–115° C. After drying and coarse comminution, a pulverulent dyeing formulation which dissolves rapidly in hot water is obtained.

If dyeing is carried out according to Example 1 or 9, a red dyeing with good fastness to light and sublimation is obtained.

If the process is carried out in a similar manner with 100 g of the dyestuff of the formula

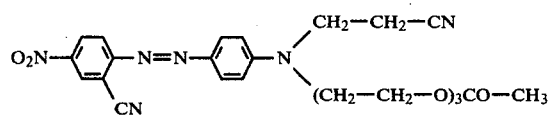

150 g of lauryl myristyl sulphate and 10 g of water, a red dyeing with good fastness properties is likewise obtained.

EXAMPLE 16

30 g of the dyestuff of the formula

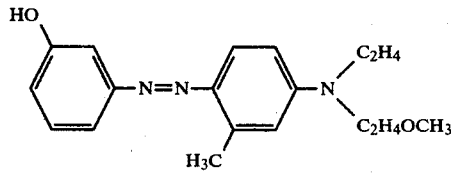

40 g of cetyl stearyl sulphate, 150 g of water and 30 g of ammonium sulphate are stirred at 80° C. to give a paste and this is dried in vacuo at 50° C. A solid formulation which dissolves readily in water is obtained.

If dyeing is carried out according to Example 1a, 9 or 22, a yellow dyeing with good general fastness properties is obtained.

EXAMPLE 17

30 g of the dyestuff of the formula

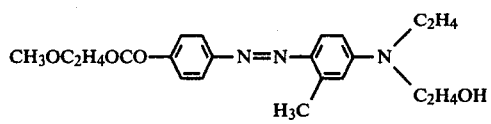

(melting point 55° C.) 60 g of lauryl myristyl sulphate, 160 g of water and 30 g of sodium sulphate are homogeneously stirred at 80° C. and the mixture is dried and coarsely ground. The dyeing formulation thus obtained dissolves readily in water. If dyeing is carried out according to Example 1a, 9 or 22, a yellow dyeing with good general fastness properties is obtained.

EXAMPLE 18

30 g of the dyestuff of the formula

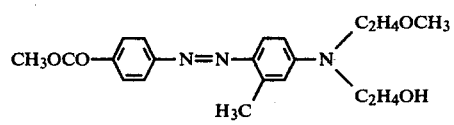

60 g of a mixture of fatty alcohol sulphates with 12 to 18 C atoms and 100 g of water are homogeneously stirred at 80° C. and the mixture is dried and ground. The dyeing formulation thus obtained dissolves readily in water. If dyeing is carried out according to Example 1(a), 9 or 22, an orange dyeing with good fastness properties is obtained.

EXAMPLE 19

100 g of the dyestuff of the formula

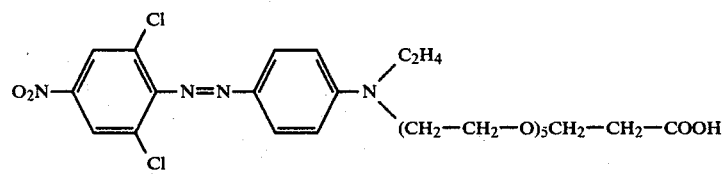

70 g of lauryl sulphate and 10 g of sodium sulphate are dissolved in 900 g of water, to which 10 ml of concentrated ammonia are added, whilst stirring. The solution thereby obtained is subjected to spray-drying, a pulverulent dyestuff formulation which dissolves readily in water being obtained. If dyeing is carried out according to Example 1 or 9, a brown dyeing with good general fastness properties is obtained.

If the process is carried out in the same manner with 100 g of the dyestuff of the formula

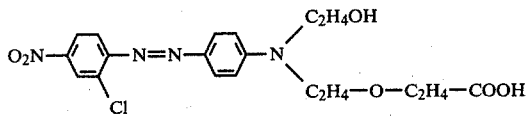

200 g of lauryl myristyl sulphate and 1,200 ml of aqueous ammonia, a red dyeing with good fastness properties is obtained.

EXAMPLE 20

30 g of the dyestuff of the formula

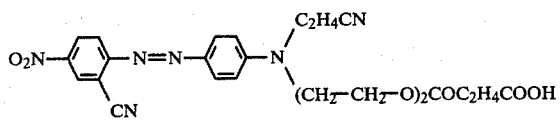

(melting point 100° C.) 60 g of a mixture of fatty alcohol sulphates with 12 to 18 C. atoms and 250 g of water are dissolved at 40° C. by stirring intensively and this solution is subjected to spray-drying. The pulverulent product thereby obtained dissolves readily in water. If dyeing is carried out according to Example 1 or 9, a red dyeing with good fastness properties is obtained.

If the process is carried out in the same manner with 150 g of the dyestuff of the formula

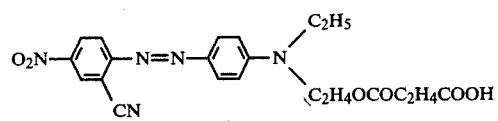

(melting point 102° C.) 350 g of fatty alcohol sulphates with 12 to 18 C atoms, 200 g of water and 300 g of methylglycol, a powder which is readily soluble in water and, after dyeing with this, a ruby-red dyeing are likewise obtained.

EXAMPLE 21

100 g of the dyestuff of the formula

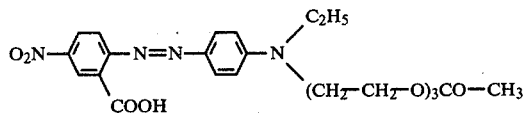

50 g of lauryl sulphate, 5 g of glacial acetic acid and 500 g of water are homogeneously stirred at 50° C. and the solution thus obtained is subjected to spray-drying.

The formulation thereby obtained gives a ruby-red dyeing with good fastness properties if dyeing is carried out according to Example 1.

EXAMPLE 22

100 g of the dyestuff of the formula

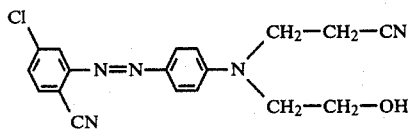

(melting point 62° C.) 150 g of cetyl stearyl sulphate, 10 g of glacial acetic acid, 450 g of water and 100 g of sodium sulphate are homogeneously kneaded at 90°–100° C. and the mixture is dried at 50° C. in vacuo and coarsely ground. The product thus obtained dissolves readily in water.

2 g of this dyeing formulation are dissolved in a dyebath of 500 ml of water which contains 0.5 g of $NaH_2PO_4$ and acetic acid to correct the pH to pH 5. 50 g of polyamide fabric are heated up to 100° C. in this liquor in a dyeing apparatus, whilst sufficiently agitating the material to be dyed and/or with adequate circulation of the liquor, and are dyed at this temperature for one hour. The fabric is then rinsed and dried. A yellow dyeing with good fastness properties is obtained. If dyeing is carried out according to Example 1(a) or 9 on polyester fabric, a yellow dyeing with good fastness properties is likewise obtained.

If the above melt is prepared without sodium sulphate and diluted with water, a clear and transparent solution of varying viscosity, depending on the amount of water, is obtained which is completely water-miscible and can be used in this form for dyeing polyamide or polyester material by the customary processes.

If the process is carried out in the same manner with 100 g of the dyestuff of the formula

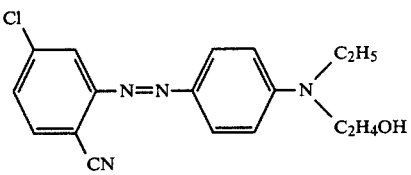

melting point 68° C. a solid dyeing formulation which is readily soluble in water and orange dyeings on polyamide fabric and polyester fabric using this formulation are likewise obtained.

If the salt-free melt is diluted to give a 20% strength solution, some of the dyestuff/emulsifier adduct immediately crystallises out at 20° C. On warming to 80°–90° C., an optically clear solution is again obtained. This liquid formulation dissolves readily in further water under the influence of heat.

If the process is carried out similarly with 100 g of the dyestuff of the formula

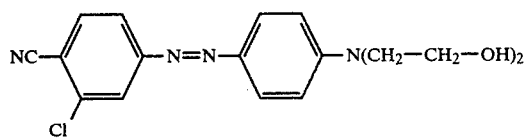

melting point 133° C. at a temperature up to 125° C., a dyeing formulation is obtained which dissolves readily in the dyebath at about 90° C. and gives dyeings in clear scarlet shades on polyamide fabric and polyester fabric if dyeing is carried out according to Example 1a, 22 or 5.

EXAMPLE 23

100 g of the dyestuff of the formula

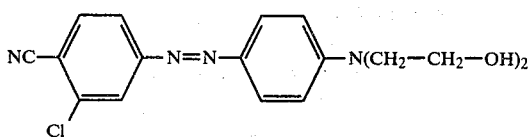

melting point 133° C. 250 g of dodecyl-dimethyl-benzyl-ammonium chloride and 15 g of water are homogeneously stirred at 110° C. to 120° C. A formulation which is mobile when warm and pasty in the cold and which dissolves readily in hot water is formed. If dyeing is carried out as in Example 22 on polyamide fabric, a clear, orange dyeing with good fastness properties is obtained.

EXAMPLE 24

150 g of the dyestuff of the formula

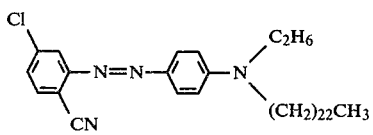

180 g of cetyl stearyl sulphate are made into a homogeneous paste with 500 g of water at 90°-95° C. If the paste is dried at 50° C. in vacuo, a solid dyeing formulation which dissolves readily in warm water is obtained. If the formulation is diluted with water to a dyestuff content of 20%, a stable formulation which can be easily poured and which dissolves readily in hot water is obtained.

If dyeing is carried out according to Example 1(a) on polyester, an orange dyeing with good fastness properties is obtained.

If the process is carried out in the same manner with the dyestuff of the formula

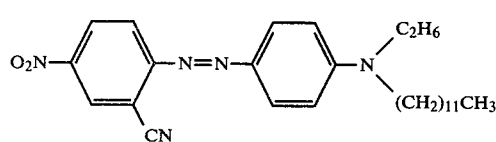

similar formulations and a red dyeing on polyester are obtained.

EXAMPLE 25

150 g of the dyestuff of the formula

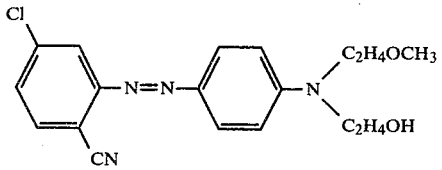

are homogeneously stirred or kneaded with 180 g of cetyl stearyl sulphate or 220 g of lauryl myristyl sulphate, 1 g of glacial acetic acid, 100 g of $Na_2SO_4$ and 150 g of water at 90° C. and the mixture is dried in vacuo at 50° C. Dyeing formulations which dissolve in water giving clear solutions are obtained. If dyeing is carried out on polyamide fabric, an orange dyeing with good fastness properties is obtained.

EXAMPLE 26

1,000 g of a stock thickener are prepared from 100 g of ethylene glycol, 790 g of ethanol, 40 g of ethylcellulose and 70 g of a maleate resin by stirring.

A dyestuff formulation consisting of 75 g of the dyestuff of the formula

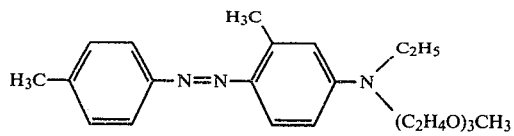

and 4.5 g of Na dodecyl-sulphate are introduced into 920.5 g of this thickener and are dispersed by stirring. A clear yellow solution of the dyestuff is obtained.

The printing paste thus obtained is printed onto suitable transfer printing papers in a known manner and dried.

For transfer onto polyester woven fabrics or knitted fabrics, the printed side of the transfer printing paper is placed onto the side of the substrate to be coloured. The transfer is effected on a heated transfer printing calender or ironing press, depending on the state of processing of the textile material, temperatures of 150°-250° C. and residence times of 5-60 seconds being applied. The transfer printing is preferably carried out at temperatures of 180°-230° C. and a heat exposure time of 5 to 30 seconds.

The dyestuff gives deep yellow prints on polyester textiles by the processes described.

EXAMPLE 27

10 parts of the dyestuff of the formula

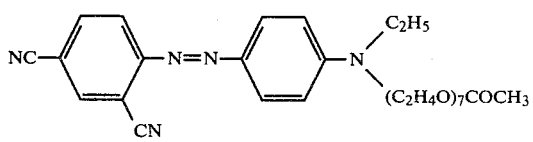

5 parts of dodecyl sulphate and 23 parts of water are warmed to 60°-70° C., whilst stirring intensively, and cooled to 15°-20° C., whilst further stirring intensively. A paste which is stable on storage and can be poured and which dissolves rapidly when stirred into water is obtained.

2 g of this dyestuff formulation are used, as described in Example 1a, for dyeing a fabric made of polyester material. A red dyeing with good fastness properties in use, in particular good fastness to light, is obtained.

EXAMPLE 28

15 parts of the dyestuff of the formula

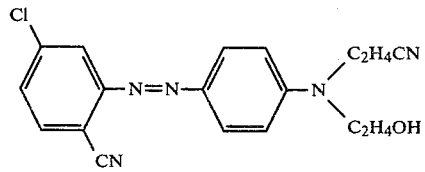

and 20 parts of a mixture of cetyl sulphate and stearyl sulphate are homogeneously kneaded with 0.5 part of water at 80°–90° C.

If (a) 25 parts of water are added, whilst stirring intensively, to 10 parts of the product thus obtained, a paste which flows and which dissolves readily in warm water is obtained, or (b) 10 parts of dimethylformamide are added to 10 parts of the product thus obtained and the mixture is warmed to 120°–130° C., whilst stirring, and cooled again to 15°–20° C., a stable solution which flows well and which dissolves rapidly in warm water is obtained, or (c) 2.6 parts of water and 6.8 parts of propylene glycol are added, whilst stirring and warming to 70°–80° C., to 10 parts of the product thus obtained, after cooling, a homogeneous paste which does not flow and which, on warming slightly, becomes mobile and pourable and dissolves readily in water is obtained.

If 18 parts of the above dyestuff are stirred with 34 parts of a 50% strength aqueous solution of dodecyl-benzyl-dimethyl-ammonium chloride and 20 parts of methyl propyl ketone, whilst warming for a short time, a formulation which flows well even when cold and which dissolves readily in water is obtained. A formulation with similar properties is obtained if the methyl propyl ketone is replaced by 0.3 g of urea.

If the process is carried out in the same manner with 18 parts of the dyestuff, 20 parts of a 75% strength aqueous paste of dodecylbenzenesulphonic acid (Na salt) and 20 parts of propylene glycol or 18 parts of the dyestuff, 60 parts of a 30% strength aqueous paste of a $C_{10}$–$C_{18}$-paraffinsulphonic acid (Na salt) and 50 parts of propylene glycol, formulations which can be poured easily in the cold and which dissolve readily in water are likewise obtained.

(a) 1 g of one of these dyeing formulations are dissolved in a dyebath of 500 ml of water which contains 0.5 g of lauryl sulphate, 0.5 g of $NaH_2PO_4$ and acetic acid to correct the pH to pH 5. After adding 2 g of o-cresotic acid methyl ester, 50 g of a polyester material are heated up to 100° C. in this liquor in a dyeing apparatus, whilst sufficiently agitating the material to be dyed or/and with an adequate circulation of the liquor, and are dyed at this temperature for one hour. The material is then rinsed and dried. An orange dyeing with good fastness properties, in particular good fastness to light, is obtained.

(b) 2 g of these dyeing formulations are dissolved in a dyebath of 500 ml of water which contains 0.5 g of $NaH_2PO_4$ and acetic acid to correct the pH to pH 5. 50 g of polyamide fabric are heated up to 100° C. in this liquor in a dyeing apparatus, whilst sufficiently agitating the material to be dyed or/and with an adequate circulation of the liquor, and are dyed at this temperature for one hour. The fabric is then rinsed and dried. An orange dyeing with good fastness properties is obtained. If the polyester fabric is dyed according to Example 1(a), an orange dyeing with good fastness properties is likewise obtained.

EXAMPLE 29

17 parts of the dyestuff of the formula

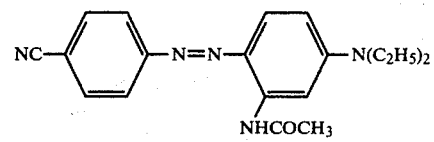

20 parts of a 75% strength aqueous paste of dodecylbenzosulphonic acid (Na salt), 5 parts of water and 40 parts of glacial acetic acid are stirred at 70° to 80° C. A liquid which becomes pasty on cooling and which dissolves readily in cold water is obtained.

2 g of this dyestuff formulation are dissolved in a dyebath of 500 ml of water which contains 0.5 g of dodecyl sulphate, 0.5 g of $NaH_2PO_4$ and acetic acid to correct the pH to pH 5. 50 g of a fabric made of polyester material are dyed in this liquor by heating the dyebath up to 120° C., whilst sufficiently agitating the fabric or/and with an adequately extensive circulation of the liquor, and carrying out the dyeing at this temperature for one hour. The fabric is then rinsed and dried. A yellow dyeing with good general fastness properties, in particular good fastness to light, is obtained.

EXAMPLE 30

18 parts of the dyestuff of the formula

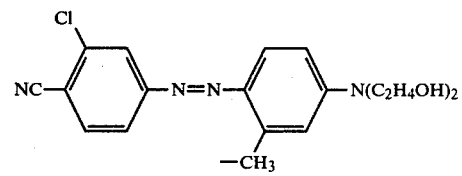

20 parts of the emulsifier in Example 28, 10 parts of water and 15 parts of propylene glycol are warmed to 70°–80° C., whilst stirring. A formulation which is mobile when warm and somewhat viscous in the cold and which dissolves readily in warm water is obtained.

2 g of this dyeing formulation are dissolved in a dyebath of 500 ml of water which contains 0.5 g of $NaH_2PO_4$ and acetic acid to correct the pH to pH 5. 50 g of polyamide fabric are heated up to 100° C. in this liquor in a dyeing apparatus, whilst sufficiently agitating the material to be dyed or/and with an adequate circulation of the liquor, and are dyed at this temperature for one hour. The fabric is then rinsed and dried. A scarlet dyeing with good fastness properties is obtained.

If 12 parts of the dyestuff are made into a paste with 5 parts of water and 50 parts of an emulsifier of the formula n-$C_{16}H_{33}(OC_2H_4)_{\sim 20}OH$, the paste is warmed to 130° C. for 5–10 hours, with occasional stirring, and, after cooling, about 10 parts of water are added, a liquid formulation which dissolves in cold water giving a clear solution and is suitable for dyeing, for example as indicated in Example 1 a and b, is obtained.

EXAMPLE 31

13 parts of the dyestuff of the formula

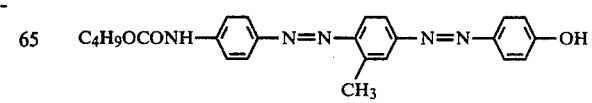

50 parts of an emulsifier of the formula $C_{16}H_{33}O(C_2H_4)_{\sim 20}H$ and 5 parts of water are warmed to 100° to 130° C. for 5–10 hours, whilst being made into a paste and stirred, and, after cooling, the paste is diluted with water to give a formulation which flows well and which dissolves in water giving a clear solution and is suitable for any dyeing process for synthetic fibres from an aqueous liquor.

EXAMPLE 32

46 parts of the dyestuff of the formula

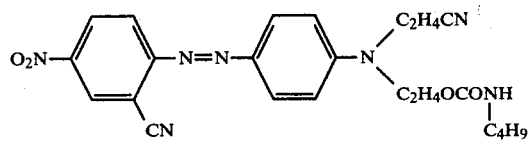

36 parts of cetyl stearyl sulphate (Na salt) and 80 parts of N-methylpyrrolidone are warmed to 150° C., whilst stirring. A formulation which can be poured easily when hot and in the cold is obtained. It is sparingly soluble in cold water and dissolves readily when added to a dyebath at 100° C., preferably 120°–130° C. A similar formulation is obtained if dimethylformamide, or 40 parts of dodecylbenzenesulphonic acid (Na salt), 5 parts of water and 30 parts of dimethylformamide, are used instead of N-methylpyrrolidone.

In a high temperature dyeing apparatus which contains a device by means of which additives can be metered into the dyebath at the dyeing temperature, 50 g of a polyester fabric are rapidly heated up to 140° C. in a bath which contains 1 g of $NaH_2PO_4$ and acetic acid to correct the pH to pH 5. After the temperature has been reached, 2 g of the dyestuff formulation obtained above are flushed into the dyebath. Dyeing is carried out at 140° C. for 30 minutes, whilst sufficiently agitating the polyester material or/and with an adequately extensive circulation of the liquor. The fabric is then rinsed and dried.

A red dyeing with outstanding fastness to light and sublimation is obtained.

EXAMPLE 33

20 parts of the dyestuff of the formula

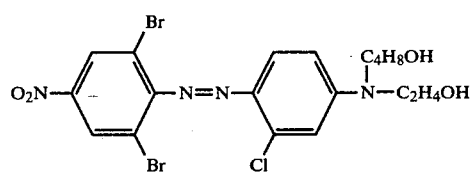

40 parts of a 50% strength aqueous solution of dodecyl-dimethyl-benzyl-ammonium chloride and 5 parts of propylene glycol are homogenised by stirring and warming to 80°–90° C. After cooling, a formulation which can be poured easily and which dissolves readily in water and is suitable for all dyeing processes from an aqueous liquor is obtained. If the procedure followed is as in Example 5 with 17 parts of the dyestuff and 50 parts of the emulsifier $n-C_{16}H_{32}O(C_2H_4O)_{20}H$, a liquid formulation of similarly good utility is obtained.

EXAMPLE 34

45 parts of the dyestuff of the formula

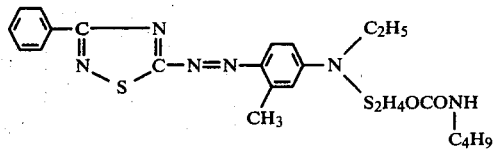

36 parts of cetyl/stearyl sulphate (in the form of the Na salt), 3 parts of water and 11 parts of propylene glycol are heated to 120°–130° C., whilst stirring. A formulation which is liquid when warm and which dissolves readily in warm water is obtained. Similar formulations are obtained if the cetyl/stearyl sulphate is replaced by dodecylbenzenesulphonic acid.

EXAMPLE 35

20 parts of the dyestuff of the formula

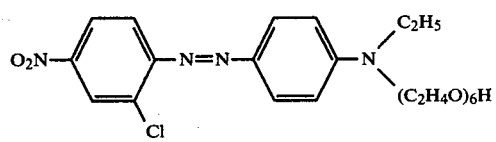

20 parts of the 80% pure sodium salt of dodecyl-sulphate (remainder $Na_2SO_4$) and 16 parts of water are dissolved together at 60°–70° C., whilst stirring. A mobile liquid formulation which can be poured easily and which mixes readily on stirring into a dye liquor is obtained.

If the process is carried out in the same manner with 20 parts of the dyestuff of the formula

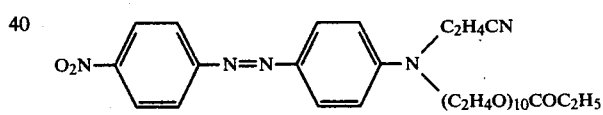

10 parts of myristyl sulphate and 100 parts of water, a liquid formulation with similar properties is obtained. Dyestuffs of the formulae

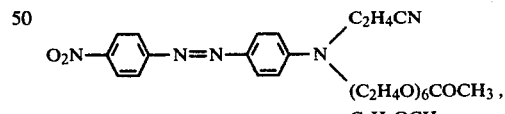

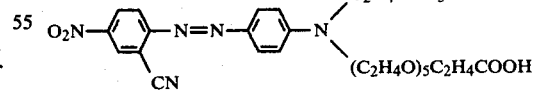

and

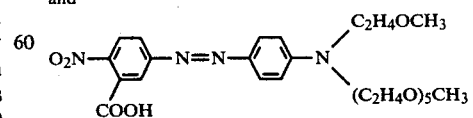

behave similarly.

EXAMPLE 36

25 parts of the dyestuff of the formula

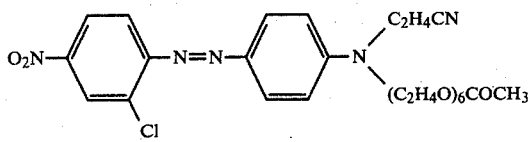

23 parts of dodecylbenzenesulphonic acid in the form of the sodium salt (75% strength paste), 10 parts of propylene glycol and 10 parts of water are homogeneously stirred with one another. A colour formulation which can be poured easily and is readily miscible with water is obtained.

If the same amount of dyestuff and emulsifier and 2 parts of glacial acetic acid and 2 parts of water are used, a similar formulation is obtained.

EXAMPLE 37

22 parts of the dyestuff of the formula

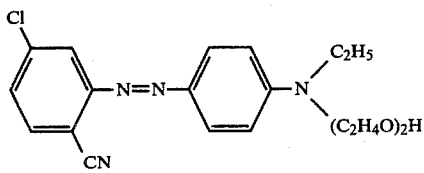

23 parts of dodecylbenzenesulphonic acid (Na salt) (75% strength paste), 15 parts of propylene glycol and 15 parts of water are stirred intensively, whilst warming slightly. A homogeneous stable liquid which is readily miscible with water is obtained.

EXAMPLE 38

23 parts of the dyestuff of the formula

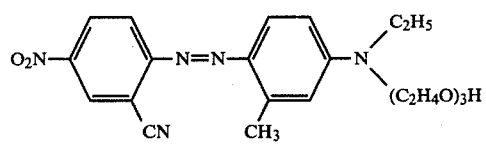

61 parts of a mixture of alkylsulphonic acids with 12-18 C atoms, in the form of the sodium salt (an approximately 30% strength paste with water), 10 parts of water and 20 parts of glacial acetic acid are homogeneously stirred, whilst warming slightly. A liquid formulation which is readily miscible with water is obtained.

A similar dyestuff formulation is obtained if the process is carried out with the same amount of dyestuff, 24 parts of 75% strength dodecylbenzenesulphonic acid in the form of the Na salt, 30 parts of water and 20 parts of glacial acetic acid or propionic acid.

If the process is carried out in the same manner with the dyestuff of the formula

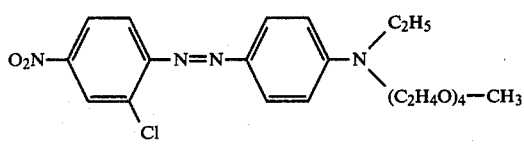

using the following amounts: 23 parts of the dyestuff, 60 parts of the mixture of alkylsulphonic acids, in the form of the Na salt as a 30% strength paste, and 15 parts of glacial acetic acid, or 23 parts of the dyestuff, 23 parts of 75% strength dodecylbenzenesulphonic acid in the form of the Na salt, 20 parts of water and 10 parts of glacial acetic acid or 10 parts of butylene glycol and 10 parts of water, liquid dyestuff formulations which are readily miscible with water are likewise obtained, as when 36 parts of dodecyl-benzyl-dimethyl-ammonium chloride (an approximately 50% strength aqueous solution) and 20 parts of propylene glycol are used.

EXAMPLE 39

20 parts of the dyestuff of the formula

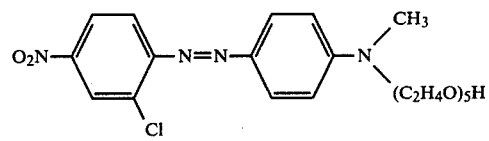

10 parts of 80% pure dodecyl sulphate in the form of the Na salt (remainder $Na_2SO_4$), 22 parts of water and 10 parts of dioxane are stirred intensively. A liquid formulation which is readily miscible with water is obtained.

EXAMPLE 40

23 parts of the dyestuff of the formula

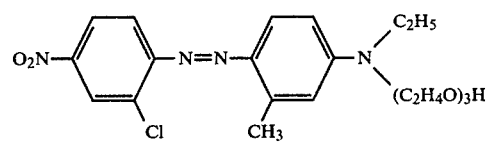

24 parts of dodecylbenzenesulphonic acid (Na salt), 75% strength aqueous paste, 20 parts of water and 20 parts of propylene glycol are stirred, whilst warming to 60°-70° C. A formulation which flows well even in the cold and which is readily miscible with water is obtained.

EXAMPLE 41

40 g of the crude, mobile, hydarted dyestuff of the formula

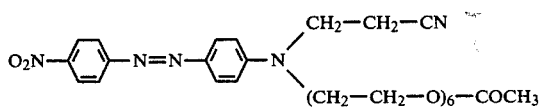

as is obtained, when washed until free from salts, by the customary preparation method for azo dyestuffs by coupling the components in aqueous solution, are dissolved with 30 g of lauryl sulphate in 300 ml of water, to which 17.5 g of sodium sulphate (anhydrous) and 17.5 g of ammonium sulphate are added, whilst stirring. This solution is dried to a fine powder in a known manner with the aid of a spray-drier.

The formulation thus obtained contains about 33% of dyestuff and dissolves readily in cold water.

2 g of this dyestuff formulation are used, as in Example 1, for dyeing a fabric made of polyester material. A red dyeing with good fastness properties in use, in particular good fastness to light, is obtained.

EXAMPLE 42

100 g of the crude, mobile, hydrated dyestuff of the formula

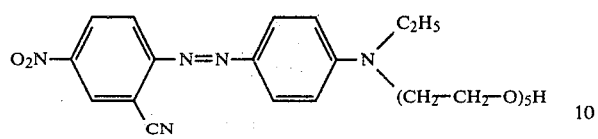

prepared as described in Example B 1, are dissolved with 50 g of dodecyl sulphate in 400 g of water, and 200 g of dextrin and 50 g of $Na_2SO_4$ are introduced, whilst stirring. The solution is dried on metal sheets and comminuted and thus converted into a pulverulent or granular dyeing formulation. If dyeing is carried out as indicated in Example 1, ruby-red dyeings with good general fastness properties are obtained.

EXAMPLE 43

100 g of the dyestuff of the formula

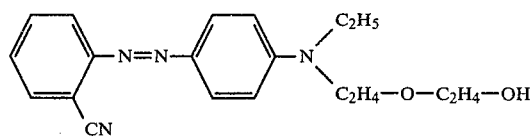

are stirred intensively with 200 g of dodecyl sulphate, 2 g of glacial acetic acid and 500 g of water at 40° C. until a homogeneous solution is obtained. The paste thus obtained is dried at 50° C. in vacuo to a residual water content of 5% and, after cooling, is coarsely comminuted.

If dyeing is carried out as described in Example 1 with the formulation thus obtained, an orange dyeing with good general fastness properties is obtained. If 100 g of dodecylbenzenesulphonic acid, 90 g of oleyl cetyl sulphate, 100 g of a mixture of the α-sulphonates of the methyk esters of stearic acid and palmitic acid or 500 g of dibutylnaphthalenesulphonate are used with the same amount of dyestuff, dyeing formulations which are similarly suitable for dyeing are obtained.

EXAMPLE 44

100 g of the dyestuff of the formula

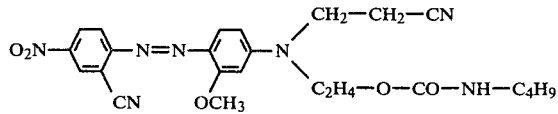

in the form of its aqueous press cake, 200 g of lauryl myristyl sulphate and 100 g of sodium sulphate (anhydrous) are homogeneously kneaded at 145° C. and, after cooling, the mixture is coarsely ground.

In a high temperature dyeing apparatus which contains a device by means of which additives can be metered into a dyeboss at the dyeing temperature, 50 g of a polyester fabric are rapidly heated up to 140° C. in a boss which contains 1 g of $NaH_2PO_4$ and acetic acid to correct the pH to pH 5. After the temperature has been reached, 2 g of the dyestuff formulation obtained above are flushed into the dyebath. Dyeing is carried out at 140° C. for 30 minutes, whilst sufficiently agitating the polyester material or/and with an adequately extensive circulation of the liquor. The fabric is then rinsed and dried.

A red dyeing with outstanding fastness to light and sublimation is obtained.

EXAMPLE 45

100 g of the dyestuff of the formula

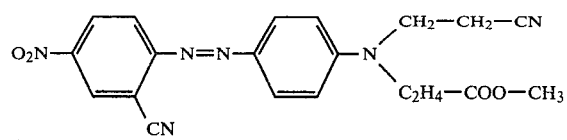

(melting point 120° C.) in the form of the water-containing press cake which has been washed until free from salts, such as is obtained in the preparation by azo coupling, are stirred with 250 g of a mixture of fatty alcohol sulphates with 12 to 18 C atoms and 5 g of glacial acetic acid, water being added in an amount such that a paste which flows well is formed at 80°–90° C., and the paste is subjected to spray-drying at an air exit temperature of 80° C. to, preferably, 140° C., during which a residual water content of about 7% should remain in the formulation.

If 2 L g of the pulverulent dyeing formulations thus obtained are used, as described in Example 4 or 1a, for dyeing polyester at 130° C., a red dyeing with good fastness to light and sublimation is obtained.

EXAMPLE 46

386 g of a dyestuff press cake (87.5% of pure dyestuff, such as is obtained from aqueous azo coupling and subsequent washing until free from salts) of the formula

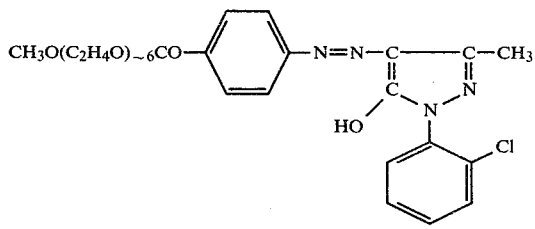

are introduced into a solution of 87.5 g of lauryl myristyl sulphate in 200 g of water at 80°–90° C., whilst stirring. As soon as a homogeneous solution has formed, a solution of 87.5 g of sodium sulphate (anhydrous) in 285 g of water having the same temperature is added, whilst further stirring, and stirring is continued for about a further 15 minutes. Thereafter, the mobile solution is subjected to spray-drying. A pulverulent dyeing formulation which dissolves readily and rapidly in water having a temperature of 60° C. is obtained.

2 g of this dyestuff formulation are dissolved in a dyebath of 500 ml of water which contains 0.5 g of dodecyl sulphate, 0.5 g of $NaH_2PO_4$ and acetic acid to correct the pH to pH 5. 50 g of a fabric made of polyester material is dyed in this liquor by heating the dyebath up to 120° C., whilst sufficiently agitating the fabric or/and with adequately extensive circulation of the liquor, and carrying out the dyeing at this temperature for one hour. The fabric is then rinsed and dried. A yellow dyeing with good general fastness properties, in particular good fastness to light, is obtained.

EXAMPLE 47

100 g of the dyestuff of the formula

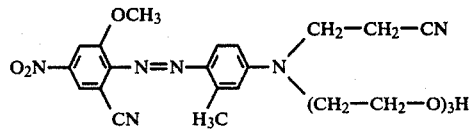

100 g of cetyl stearyl sulphate, 100 g of sodium chloride and 10 g of water are intensively kneaded, whilst warming to 110°-115° C. After drying and coarse comminution, a pulverulent dyeing formulation which dissolves rapidly in hot water is obtained.

If the process is carried out in the same manner with 100 g of the dyestuff of the formula

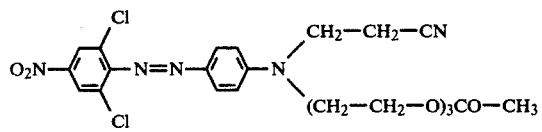

150 g of lauryl myristyl sulphate, 50 g of sodium phosphate and 10 g of water, a pulverulent formulation which is readily soluble is likewise obtained.

EXAMPLE 48

100 g of the dyestuff of the formula

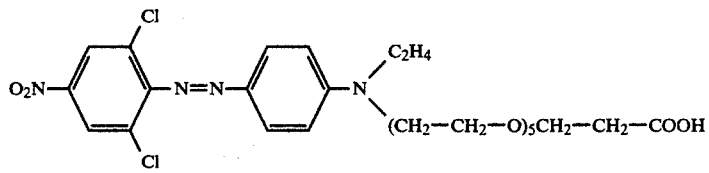

70 g of lauryl sulphate and 10 g of sodium sulphate are dissolved in 900 g of water, whilst stirring, to which 10 ml of concentrated ammonia are added. The solution thereby obtained is subjected to spray-drying, a pulverulent dyestuff formulation which dissolves readily in water being obtained.

EXAMPLE 49

100 g of the dyestuff of the formula

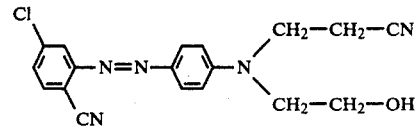

(melting point 62° C.) 150 g of cetyl stearyl sulphate, 10 g of glacial acetic acid, 10 g of water and 100 g of sodium sulphate are homogeneously kneaded at 90°-100° C. The products thus obtained dissolve readily in water. A similarly good formulation is obtained if the process is carried out in the same manner without adding glacial acetic acid but with 35 g of water.

2 g of this dyeing formulation are dissolved in a dyebath of 500 ml of water which contains 0.5 g of $NaH_2PO_4$ and acetic acid to correct the pH to pH 5. 50 g of a polyamide fabric are heated up to 100° C. in this liquor in a dyeing apparatus, whilst sufficiently agitating the material to be dyed or/and with adequate circulation of the liquor, and are dyed at this temperature for one hour. The fabric is then rinsed and dried. A yellow dyeing with good fastness properties is obtained. If dyeing is carried out according to Example 1(a) on polyester fabric, a yellow dyeing with good fastness properties is likewise obtained.

If the abovementioned dyestuffs are replaced by one of the dyestuffs listed in the Table which follows, equivalent formulations which dye polyester fibres in the colour shades indicated are obtained.

TABLE

|  | Colour shade on polyester |
|---|---|
| CH₃O(C₂H₄O)₃CO—⟨⟩—N=N—⟨⟩—N(C₂H₄)((C₂H₄O)₃—⟨⟩) | yellow |
| HOC₂H₄O—⟨⟩—N=N—⟨⟩(H₃C)—N(C₂H₄)(C₂H₄OCH₃) | yellow |
| ⟨⟩—N=N—⟨⟩—N=N—⟨⟩—N(C₂H₄)((C₂H₄O)₃H) | red |
| O₂N—⟨⟩(NO₂)—NH—⟨⟩—O(C₂H₄O)₃CH₃ | yellow |

TABLE-continued
| | Colour shade on polyester |
|---|---|
| 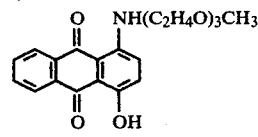 | red |
| 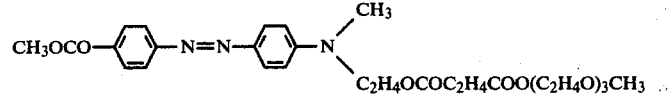 | yellow |
| 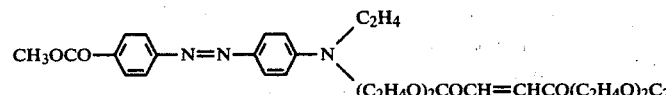 | yellow |
| 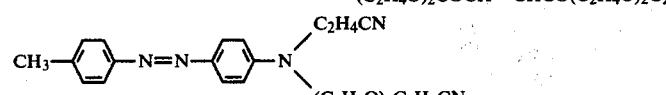 | yellow |
| 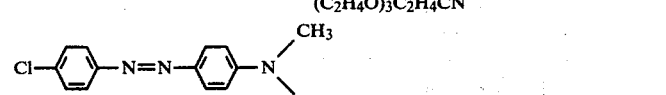 | yellow |
| 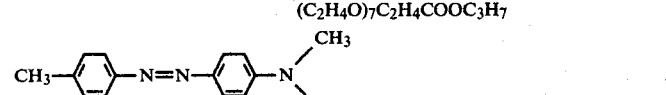 | yellow |
| 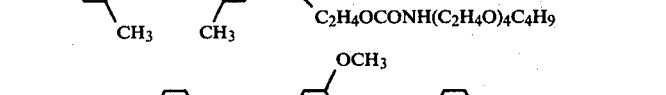 | yellow |
| 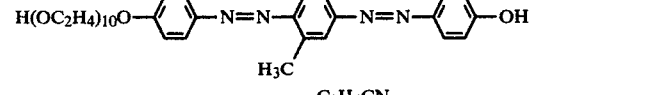 | red |
| 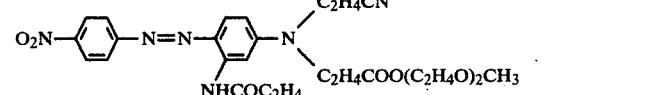 | yellow |
| 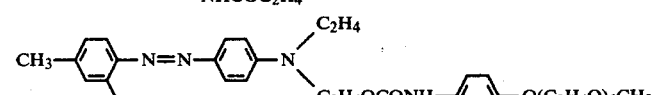 | yellow |
| 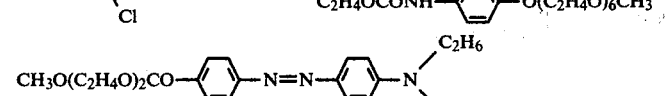 | yellow |
| 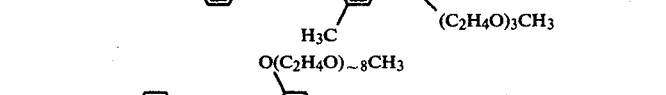 | greenish-tinged yellow |
| 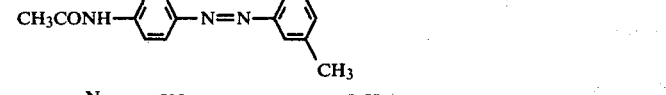 | brown |
| 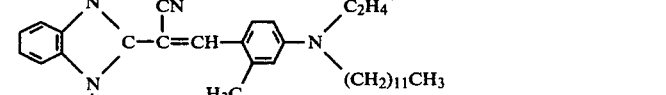 | white |

| | Colour shade on polyester |
|---|---|
| [structure: phenyl-triazine with OC(C2H4O)3OCH3] | white |
| CH3COOC2H4OC2H4—N[naphthalimide-benzimidazole] | yellow |
| CH3OC2H4O, CH3OC2H4O—[naphthalimide with dimethylbenzimidazole] | greenish-tinged yellow |
| O2N—C6H4—N=N—C6H4—N(C2H5)(C2H4O)4CH3 | orange |
| O2N—C6H4—N=N—C6H3(OCH3)—N(C2H5)(C2H4O)3CH3 | red |
| NC\C(COOC2H5)=CH—C6H3(CH3)—N(C2H5)(C2H4O)6COCH3 | greenish-tinged yellow |
| HOC2H4O—[naphthalimide with OCH3-benzimidazole] | yellow |
| CH3—C6H4—N=N—C6H4—NH(C2H4O)2H | yellow |
| CF3—C6H4—N=N—C6H3(CH3)—NH(C2H4O)2CH3 | yellow |
| CH3OCO—C6H4—N=N—C6H3(NHCOCH3)—NH(C2H4O)2CH3 | orange |
| H2NCO—C6H4—N=N—C6H4—N(CH3)(C2H4O)2CH3 | orange |
| Cl,CN—C6H3—N=N—C6H4—NHC2H4OH | orange |
| NC,CN—C6H3—N=N—C6H3(CH3)—NHC2H4OH | orange |
| NC,CN—C6H3—N=N—C6H3(NHCOCH3)—NHC2H4OH | red |
| NC—C6H4—N=N—C6H4—NHC2H4CN | orange |

| | Colour shade on polyester |
|---|---|
| TABLE-continued | |
| 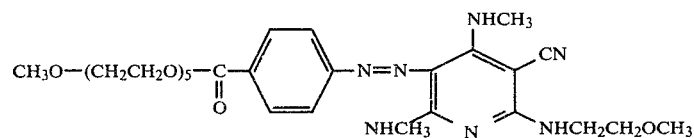 | orange |

EXAMPLE 50

500 parts of a polyester yarn are dyed in the form of a wound package in a cheese dyeing apparatus with a dyestuff reservoir in the by-pass; for this, the reservoir, which contains a V4A sieve with rectangular holes 0.1 to 0.2 mm × 1-2 mm, that is to say 0.1 mm$^2$-0.4 mm$^2$, in size, is charged with 1.4% of a dyestuff formulation consisting of 50% of Na dodecylsulphonate and 50% of the dyestuff of the formula $$CH_3O-(CH_2CH_2O)_5-\underset{O}{\underset{\parallel}{C}}-\bigcirc-N=N-\underset{\underset{NHCH_3}{|}}{\overset{\overset{NHCH_3}{|}}{C}}=\underset{N}{C}-\underset{NHCH_2CH_2OCH_3}{\overset{CN}{C}}$$

the installation is filled up with water which contains 1 g/l of dodecyl sulphate and 1 g/l of sodium acetate and 1 ml of 30% strength acetic acid to control the pH, and the liquor is heated up to 130° C. as rapidly as possible, the liquor being continuously changed by circulation. The circulation through the attached wound package takes place from the inside outwards. After a dyeing time of 45 minutes at 130° C., the dyestuff is exhausted; after cooling to below 80° C., the dyebath is drained off. The alkaline-reductive after-treatment with 3 ml of sodium hydroxide solution of 38° Be strength and 2 g/l of hydrosulphite which usually follows is dispensed with. The yarn is rinsed hot and cold in order to achieve optimum fastness properties.

A brilliant fluorescent yellow dyeing is obtained which in no way differs in depth of colour and colour shade from a dyeing which is achieved with the dyestuff finished in the customary manner, when the same amount of pure dyestuff is used and the dyeing is subjected to alkaline-reductive after-purification.

If the amounts of emulsifier added to the dyebath are increased to 2 g/l to 3 g/l and the procedure is otherwise as indicated above, dyeings with the same depth of colour, brilliance and fastness properties are achieved. These amounts of emulsifier can, of course, also be added to the dyestuff introduced into the reservoir, it being possible to dispense with addition of an emulsifier to the liquor.

EXAMPLES 51–56

If the dyestuffs and amounts of auxiliaries listed in the Table which follows are used instead of the dyestuff and emulsifier used in Example 50 and the procedure is otherwise the same, level dyeings with the same depths of colour, as are given with conventionally finished disperse dyestuffs by the customary procedure, are obtained. Column II of the table gives the structure of the dyestuff, column III gives the amount of emulsifier in g/l and column IV gives the resulting colour shade. The emulsifier here are mainly contained in the formulations which are introduced into the reservoirs.

| Example | Structure | Emulsifier | Colour shade |
|---|---|---|---|
| 51 | CH₃OC(O)—⌬—N=N—C(=C(OH))—C(CH₃)=N—N(phenyl) (pyrazolone) | 1 g/l of dodecylsulphonate<br>2 g/l of dodecylsulphonate<br>4 g/l of dodecylsulphonate | yellow<br>yellow<br>yellow |
| 52 | O₂N—⌬(Br,Br)—N=N—⌬(Cl)—N(C₂H₄OH)₂ | 1 g/l of hexadecyl sulphate | brown |
| 53 | O₂N—⌬(Cl)—N=N—⌬—N(C₂H₄—C(O)—OCH₃)(C₂H₄CN) | 1 g/l of hexadecyl sulphate<br>2 g/l of hexadecyl sulphate<br>4 g/l of hexadecyl sulphate | scarlet |
| 54 | O₂N—⌬(CN)—N=N—⌬—N(C₂H₄CN)(C₂H₄—CO₂CH₃) | 1 g/l of hexadecyl sulphate | red |

| Example | Structure | Emulsifier | Colour shade |
|---|---|---|---|
| 55 | 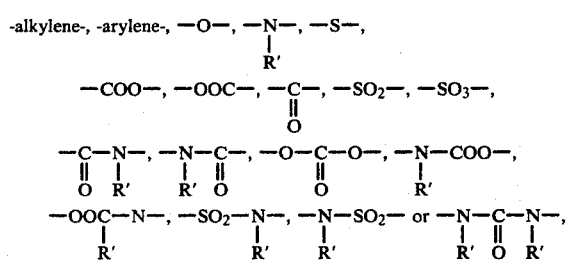 | 0.5 g/l of hexadecyl sulphate<br>2.0 g/l of hexadecyl sulphate<br>4.0 g/l of hexadecyl sulphate | red<br>red<br>red |
| 56 | 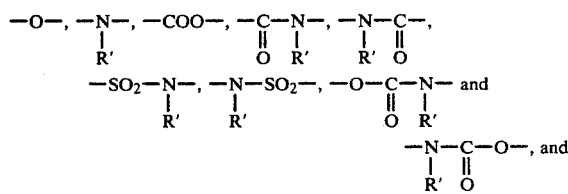 | 0.5 g/l of dodecyl sulphate<br>4.0 g/l of dodecyl sulphate | red<br>red |

We claim:

1. A homogeneous dyestuff formulation free of organic solvent obtained without fine comminution of the dyestuff to below a particle size of 50μ consisting essentially of an organophilic dyestuff free from ionic groups other than COOH and having a melting point of less than 140° C. admixed with an emulsifying polar/non-polar compound of the formula $$A—(B)_n—(D)_m$$

in which

A is a non-polar radical with at least 8 consecutive carbon atoms;
B is a bridge member;
n is 0 to 5;
D is a hydrophilic group; and
m is 1 to 5.

2. A dyestuff formulation according to claim 1, wherein the pure dyestuff has a melting point below 100° C.

3. A dyestuff formulation according to claim 1, wherein it contains a dyestuff of the formula $$F_1—(G)_x—(R_1)_y$$

in which $F_1$ represents a chromophoric system of the azo, azomethine, anthraquinone, methine, quinophthalone, perinone or diarylamine series,
$G_1$ represents a direct bond or one of the groupings

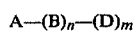
-alkylene-, -arylene-, —O—, —N—, —S—,
              |
              R'

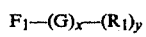
—COO—, —OOC—, —C—, —SO₂—, —SO₃—,
                ‖
                O

—C—N—, —N—C—, —O—C—O—, —N—COO—,
‖  |    |  ‖    ‖         |
O  R'   R' O    O         R'

—OOC—N—, —SO₂—N—, —N—SO₂— or —N—C—N—,
     |        |    |              |  ‖  |
     R'       R'   R'             R' O  R' wherein

R' denotes H or $C_1$-$C_4$-alkyl radicals or $R_1$, and
$R_1$ represents a hydrocarbon radical with 4-12 carbon atoms or groupings of the general formula

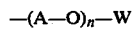
$$—(A—O)_n—W$$

in which

A denotes an alkylene radical with 2-4 carbon atoms,
n represents integers from 2-10 and
W denotes H, alkyl, alkenyl, acyl, aryl, aralkyl or hetaryl and x and y represent 1-4.

4. A dyestuff formulation according to claim 1, wherein it contains a dyestuff of the formula $$F_2—(G_2)_x—(R_2)_y$$

in which x and y represent 1-3,
$F_2$ represents a chromophoric system of the azo, anthraquinone, perinone or quinophthalone series,
$G_2$ represents a direct bond or a bridge member from the group comprising

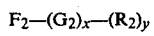
—O—, —N—, S, —SO₂—, —COO—, —C—,
      |                       ‖
      R'                      O —C—N—, —N—C—, —SO₂—N—, —N—SO₂—,
‖  |    |  ‖       |    |
O  R'   R' O       R'   R'

—O—C—N—, —N—C—O—,
   ‖  |    |  ‖
   O  R'   R' O alkylene or arylene,

R' represents H or a $C_1$-$C_4$-alkyl radical or $R_2$ and
$R_2$ represents an alkyl radical with 4-12 carbon atoms and/or a radical of the formula

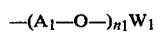
$$—(A_1—O—)_{n_1}W_1$$

in which $A_1$ denotes an optionally substituted ethylene radical,
$W_1$ denotes H, alkyl, alkenyl, aryl or acyl,
$n_1$ denotes integers from 3–8 and
R' denotes H or an alkyl radical or $R_2$.

5. A dyestuff formulation according to claim 1, wherein it contains a dyestuff of the formula $$(F_3—(G_3)_{x'}—(R_3)_{y'}$$

in which x' and y' denote 1 or 2,
$F_3$ denotes the radical of an azo or anthraquinone dyestuff
$G_3$ denotes a direct bond or a bridge member of the formulae

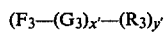
—O—, —N—, —COO—, —C—N—, —N—C—,
      |            ‖  |    |  ‖
      R'           O  R'   R' O —SO₂—N—, —N—SO₂—, —O—C—N— and
     |    |           ‖  |
     R'   R'          O  R'

—N—C—O—, and
 |  ‖
 R' O $R_3$ denotes the grouping —(CH₂—CH₂—O)$_{n_2}$—W₂, wherein $n_2$ represent integers from 3-8 and
$W_2$ denotes H, alkyl or $$-\underset{\underset{O}{\|}}{C}-R''$$

wherein
R'' represents alkyl or aryl.

6. A dyestuff formulation according to claim 1, wherein the hydrocarbon radicals mentioned therein, such as alkyl, aryl, aralkyl, cycloalkyl, arylene, alkenyl, and alkylene, and the hetaryl radicals can contain further substituents which are customary in the chemistry of dyestuffs and dyestuff auxiliaries, and the dyestuff radicals contain no ionic radicals, with the exception of COOH.

7. A dyestuff formulation according to claim 1, wherein the dyestuff component and emulsifier are in the molar ratio of 1:0.1 to 1:4.

8. A dyestuff formulation according to claim 1, wherein D is an anionic or uncharged group.

9. A dyestuff formulation according to claim 1, wherein A is an aliphatic hydrocarbon radical containing at least 10 consecutive carbon atoms; n is 0 to 2; and D is —COOH, —SO$_3$H, —PO$_3$H$_2$, or —O—PO$_3$H$_2$.

10. A dyestuff formulation according to claim 1, wherein the dyestuff formulation is a pulverulent formulation.

11. A dyestuff formulation according to claim 1, wherein the dyestuff carries substituent groupings having a hydrophilic action, from the series comprising

—COOH, —COOR, —O—COOR, —O—CONHR, $-\underset{\underset{O}{\|}}{C}-R$, —SO$_2$—R, —SO$_2$—OR, —NH—SO$_2$—R, $-SO_2-N\begin{smallmatrix}R_1\\ \\R_2\end{smallmatrix}$, $-(CH_2-CH_2-O-)_n-R''$ or $-CON\begin{smallmatrix}R_1\\ \\R_2\end{smallmatrix}$, wherein
R represents optionally substituted alkyl, aralkyl or aryl,
$R_1$ and $R_2$ denote hydrogen or optionally substituted alkyl, aralkyl or aryl,
R'' represents $R_1$ or acyl and
n represents numbers from 1-8.

12. A dyestuff formulation according to claim 11, characterized in that the dyestuff carries substituents having a hydrophilic action, from the series comprising —COOH, COOR, —O—COOR, —O—CONHR or —(C$_2$H$_4$O)$_n$—R''.

13. A dyestuff formulation according to claim 1, wherein it contains a dyestuff or the formula $$F-(G)_x-(R)_y$$

in which
F represents a chromophoric or brightening system,
G represents a direct bond or a polyvalent bridge member and
R represents a hydrocarbon radical, having essentially a continuous carbon chain, with C$_4$-C$_{24}$ C atoms, or a polyoxyalkylene radical with 2-10 oxyalkylene units and x and y represent 1-4.

14. A dyestuff formulation according to claim 13, wherein it contains a dyestuff or the formula $$F-N-(A_1-O-)_{n1}W_1$$

in which
$A_1$ denotes an ethylene radical,
R' denotes H or alkyl,
$W_1$ denotes H, alkyl, alkenyl, aryl or acyl and
$n_1$ denotes integers from 3-8.

15. A dyestuff formulation according to 14, wherein A is an aliphatic hydrocarbon radical with at least 10 C atoms, and D is —SO$_3$H, —OSO$_3$H; or —OPO$_3$H$_2$.

16. A dyestuff formulation according to claim 14, wherein A is an aliphatic hydrocarbon chain with from 12 to 18 consecutive carbon atoms, and D is —O—SO$_3$H.

17. A dyestuff formulation according to claim 3, 4, 5 or 6, wherein the radicals R represent C$_4$-C$_{12}$-alkyl.

18. Dyestuff formulation of claim 1, wherein the formulation is a liquid formulation further including water and containing at least 10% by weight of dyestuff.

19. A dyestuff formulation according to claim 18, wherein water is present in the amount of from 10 to 30%.

20. A method of preparing a dyeing liquor comprising a solution or liquid emulsion of an organophilic dyestuff free from ionic groups other than COOH and having a melting point below 140° C., without fine comminution of the dyestuff to below a particle size of less than about 50μ consisting essentially of combining the dyestuff with an emulsifying polar/non-polar compound of the formula $$A-(B)_n-(D)_m$$

in which
A is a non-polar radical with at least 8 consecutive carbon atoms:
B is a bridge member;
n is 0 to 5;
D is a hydrophilic group; and
m is 1 to 5,
to form a homogeneous dyestuff formulation free of organic solvent and combining the formulation with a dyebath consisting essentially of water.

21. The method of claim 20, wherein the dyeing liquor is employed for dyeing polyester, cellulose ester or synthetic polyamide.

22. The method of claim 21, wherein the process is carried out by the extraction method.

23. Process according to claim 22, wherein the extracting liquor is purely aqueous.

24. A method of converting an organophilic dyestuff free from ionic groups other than COOH and having a melting point below 140° C. to a form yielding a very stable dyeing liquor without fine comminution of the dyestuff to below a particle size of 50μ, consisting essentially of combining the dyestuff with an emulsifying polar/non-polar compound of the formula $$A-(B)_n-(D)_m$$

in which
A is a non-polar radical with at least 8 consecutive carbon atoms;
B is a bridge member;

n is 0 to 5;

D is a hydrophilic group; and m is 1 to 5, to form a homogeneous dyestuff formulation free of organic solvent which upon addition to an aqueous dyebath provides a solution or liquid emulsion of the dyestuff.

25. The method of claim 20 or 24, wherein the emulsifying compound is combined with a moist filter presscake, or an oily or pasty color composition obtained in the preparation of the dyestuff.

26. The method of claim 20 or 24 wherein the dyestuff formulation is coarsely comminuted to an average particle size of no less than $50\mu$.

27. The method of claim 20 or 24 wherein the dyestuff and emulsifying compound are further combined with water to form a liquid homogeneous dyestuff formulation containing at least 10% by weight of dyestuff.

28. The method of claim 20 or 24 wherein the emulsifying compound and the dyestuff are additionally combined with an organic or inorganic salt which absorbs water from moist air without deliquescing to form a pulverulent homogeneous dyestuff formulation.

29. The method of claim 28, wherein the salt is anhydrous sodium sulphate.

* * * * *